(12) United States Patent
Yoshida et al.

(10) Patent No.: US 6,411,590 B1
(45) Date of Patent: Jun. 25, 2002

(54) DISC REPRODUCING APPARATUS

(75) Inventors: Susumu Yoshida; Tomomichi Kimura; Takashi Mizoguchi; Kenjiro Ido; Toru Suzuki; Kenji Nakamura, all of Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/448,170

(22) Filed: Nov. 24, 1999

(30) Foreign Application Priority Data

Nov. 27, 1998 (JP) .......................................... 10-337145

(51) Int. Cl.[7] .......................... G11B 19/10; G11B 19/14
(52) U.S. Cl. ..................................... 369/184; 369/30.89
(58) Field of Search ................................ 360/92, 98.04; 369/184, 178, 181, 183, 186, 187, 185, 188, 190, 191, 192, 194, 196, 34, 36, 38, 30.88, 30.89

(56) References Cited

U.S. PATENT DOCUMENTS 5,726,828 A * 3/1998 Kakuta et al. ........... 360/98.01
6,052,356 A * 4/2000 Fujimoto et al. ........... 369/192
6,134,213 A * 10/2000 Suzuki et al. ............... 369/192
6,185,164 B1 * 2/2001 Takemasa et al. ............ 369/34

* cited by examiner

Primary Examiner—Brian E. Miller
(74) Attorney, Agent, or Firm—Arent Fox Kintner Plotkin & Kahn

(57) ABSTRACT

A disc reproducing apparatus comprises a disc holder for receiving a plurality of discs; a disc reproducing section including a turntable for mounting a disc, an optical pickup for reproducing information recorded on the disc, a pickup moving mechanism for moving the optical pickup in the radial direction of the disc; a reproducing section pivoting means for pivoting the reproducing section between a reproducing position and a non-reproducing Position; and a disc transporting means for transporting a disc inserted from the outside to the disc holder. In particular, the disc reproducing section includes a position detecting means for detecting a position of the optical pickup in the reproducing apparatus. Further, when the disc reproducing section is in its non-reproducing position, the position detecting means is adapted to detect the position of a disc which has been transported from the outside into the apparatus.

9 Claims, 21 Drawing Sheets

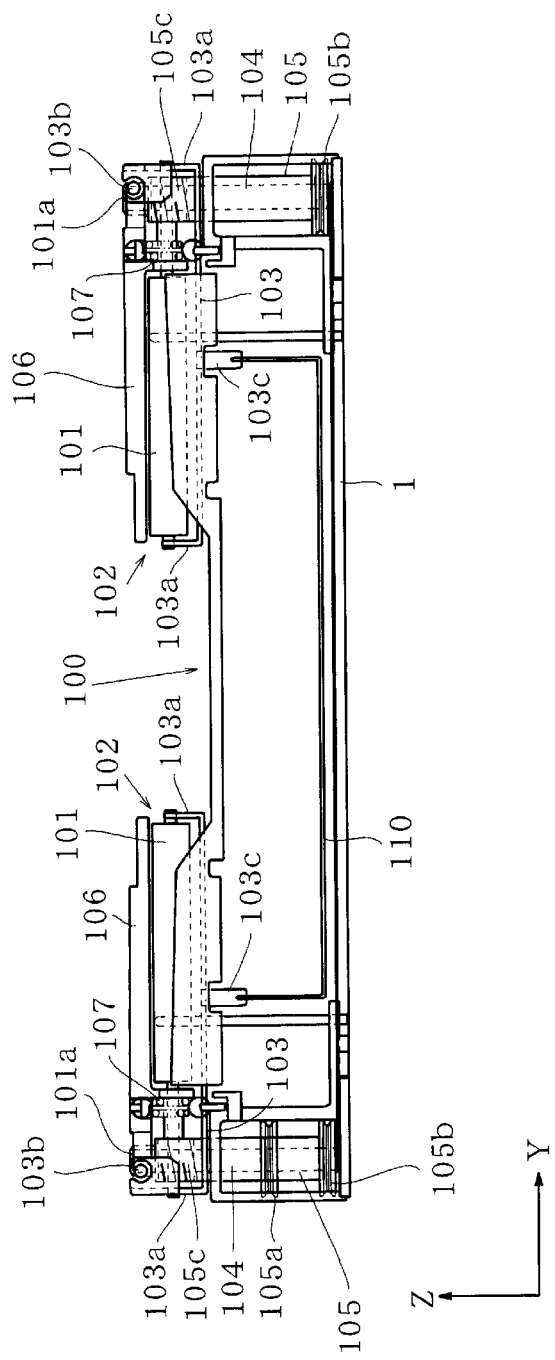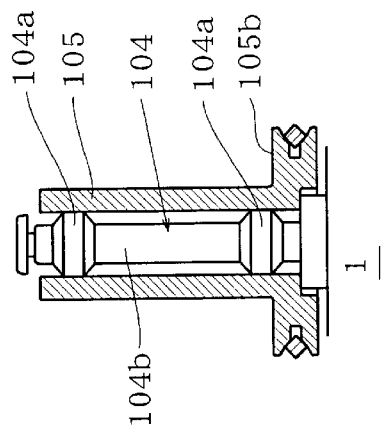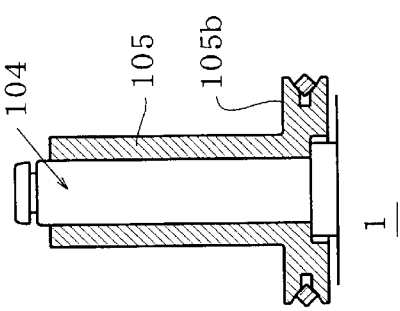

DISC REPRODUCING APPARATUS

BACKGROUND OF THE INVENTION

The present invention relates to a disc reproducing apparatus.

In general, a compact disc (hereinafter referred to as disc) has a diameter of 12 cm and a thickness of 1.2 mm. The information recorded on the disc is reproduced continuously from its inner circumferential area to its outer circumferential area.

There have been known several types of disc reproducing apparatus which can accommodate a plurality of discs, and can select one disc therefrom so as to reproduce the same. One type of disc reproducing apparatus has a structure in which a detachable magazine accommodating a plurality of discs is at first installed into the apparatus, and one disc is then selected therefrom when it is to be reproduced.

One of the above-described disc reproducing apparatus is disclosed by the applicant in Japanese Patent Application No. 10-107266, as shown in FIG. 25.

Referring to FIG. 25, the disc reproducing apparatus is formed with an elongated opening A1 through which a disc can be inserted into or removed from the reproducing apparatus.

As shown in FIG. 25, a pair of disc driving rollers B are provided within the reproducing apparatus, located near both ends of the elongated opening A1. Each of the disc driving rollers B is arranged horizontally in parallel with the disc transporting direction, and is rotatable in either direction so as to assist a disc in its movement into or from the apparatus. Further, each roller B is allowed to make a semi-circular turning about its inner end B1. In addition, the surface of each roller B is formed into a tapered shape being gradually sharpened towards the center line of the disc movement, in order that a disc being transported is sure to be moved along the center line.

The reproducing apparatus contains a disc holder C provided close to the front side of the apparatus. The disc holder C has a plurality of trays C1 arranged in the vertical direction, with each tray being able to hold one disc D.

Further referring to FIG. 25, a disc reproducing section E is provided within the reproducing apparatus close to the rear side thereof. The reproducing section E comprises a turntable F for mounting an optical disc, an optical pickup section G for reproducing the information recorded on the disc, a pickup moving means H for slidingly moving the pickup section G in the radio direction of the disc, a detecting switch I and a home switch HSW which are capable of detecting an innermost circumferential position of a disc in order that the pickup section G can exactly stop at the innermost circumferential position. The reproducing section E further comprises a clamper J which is pivotably supported through one end J1 thereof on the reproducing section E. The other end J2 of the clamper J can downwardly press the disc D. In fact, the reproducing section E is horizontally pivotable about a shaft K.

The detecting switch I is pivotably supported on the reproducing section E and it is pivotable about a pivot shaft Ia, but is constantly urged in the clockwise direction by virtue of a coil spring (not shown).

Further, the detecting switch I has an engaging member Ib which can engage on one end of the pickup moving means H, so that once the engaging member Ib is pushed by one end of the pickup moving means H, the switch I can be rotated in the counter clockwise direction against the urging force of the coil spring.

Moreover, the detecting switch I is provided with an arm member HSWA in a manner such that when the detecting switch I is caused to pivot about the pivot shaft Ia, the arm member HSWA will get in contact with or leave from the home switch HSW, thereby making ON or OFF the home switch HSW. In fact, the home switch HSW is adapted to control the driving of the moving means H, but is normally in OFF state (when not controlling the movement of the moving means H).

When a disc is to be reproduced from its innermost circumferential portion, the pickup section G is slidably moved towards the innermost portion. At this moment, the front end of the pickup moving means H will push the engaging member Ib of the detecting switch I, so as to cause the detecting switch I to turn in the counter clockwise direction. If, at this time, the home switch HSW is in its ON state, it will be detected that the pickup section G has moved into a position inner than the innermost circumferential area of the disc D, so that the movement of the moving mechanism H is stopped immediately, thereby preventing a contact between the pickup section G and the turntable F. Then, the pickup section G is moved backward until the home switch HSW becomes OFF.

On the other hand, when a disc D is to be received into a desired position within the reproducing device, at first, a selected tray C1 has to be moved up to a height corresponding to the driving rollers B. When a disc D is inserted from the outside of the reproducing apparatus, the driving rollers B are caused to rotate so as to move the disc D on to the selected tray C1.

When the disc D is to be reproduced, the reproducing section E is caused to pivot about the pivot shaft K in the clockwise direction. Then, the disc D is moved onto the turntable F, and the clamper J is operated to press down the disc D so as to clamp the same. Subsequently, the pickup section G begins to move from the innermost circumferential portion of the disc by virtue of the moving mechanism H, thereby starting the reproduction of the disc D.

However, with the above conventional reproducing apparatus, if a detecting means is provided to detect whether a disc inserted from the outside has been exactly received in a predetermined position within the reproducing apparatus, the operation of the reproducing apparatus may be performed in a more correct manner.

SUMMARY OF THE INVENTION

It is an object of the present invention to provide an improved disc reproducing apparatus which is provided with highly reliable detecting means capable of carrying out various detections, including detecting whether a disc inserted from the outside has been exactly received in a predetermined position within the reproducing apparatus, so that the operation of the reproducing apparatus may be performed in a more correct manner.

According to the present invention, there is provided a disc reproducing apparatus which comprises a disc holder for receiving a plurality of discs; a disc reproducing section including a turntable for mounting a disc, an optical pickup for reproducing information recorded on the disc, a pickup moving mechanism for moving the optical pickup in the radial direction of the disc; a reproducing section pivoting means for pivoting the reproducing section between a reproducing position and a non-reproducing position; and a disc transporting means for transporting a disc inserted from the outside to the disc holder. In particular, the disc reproducing section includes a position detecting means for detecting a position of the optical pickup in the reproducing apparatus. Further, when the disc reproducing section is in its non-reproducing position, the position detecting means is adapted to detect the position of a disc which has been transported from the outside into the apparatus.

In one aspect of the present invention, the position detecting means includes a pivotable arm pivotable between a detecting position and a non-detecting position, a switch which can be made ON or OFF by virtue of the pivotable arm, said pivotable arm having a first portion which can be pressed by the pickup and a second portion which can be pressed by a disc.

In another aspect of the present invention, the switch is adapted to control a driving action of the reproducing section moving means and also to control a transporting action of the disc transporting means.

In a further aspect of the present invention, the position detecting means is adapted to detect whether the optical pickup is in an innermost circumferential position of a disc.

In a still further aspect of the present invention, the position detecting means is adapted to detect whether a disc inserted from the outside has been transported to a desired tray of the disc holder.

In one more aspect of the present invention, when the disc reproducing section is in its non-reproducing position, the optical pickup is in a Position not detectable by the position detecting means.

In one more aspect of the present invention, the disc reproducing section is movable in a disc arranging direction along which the plurality of discs are arranged one above another in the disc holder.

In one more aspect of the present invention, the disc holder includes a plurality of trays each capable of mounting one disc and movable in the disc arranging direction.

In one more aspect of the present invention, when a disc is transported by the disc transporting means, the disc reproducing section is kept at the same height as that of a tray which will receive and hold the disc.

The above objects and features of the present invention will become better understood from the following description with reference to the accompanying drawings.

BRIEF DESCRIPTION OF DRAWINGS

FIG. 4A is a front view of the disc reproducing apparatus.

FIGS. 4B and 4C are sectional views indicating part of the apparatus of FIG. 4A.

DETAILED DESCRIPTION OF THE PREFERRED EMBODIMENTS

Figure 1:
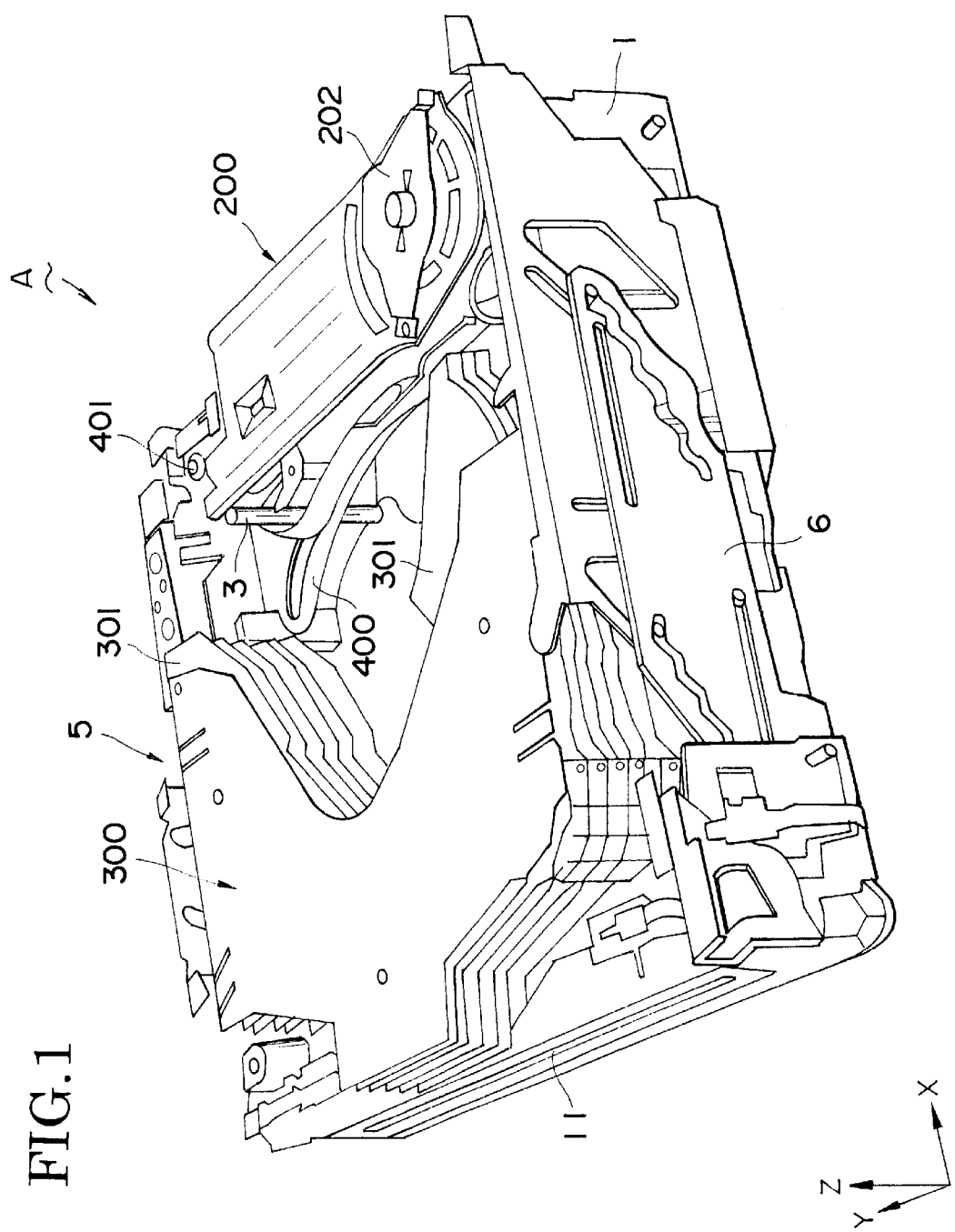
FIG. 1 is a perspective view indicating the disc reproducing apparatus made according to the present invention.

Referring to FIG. 1, a disc reproducing apparatus A of the present invention has a chassis 1 which is formed with an elongated opening 11 on the front side thereof, so that a disc may be inserted into or removed from the reproducing apparatus A.

Figure 2:
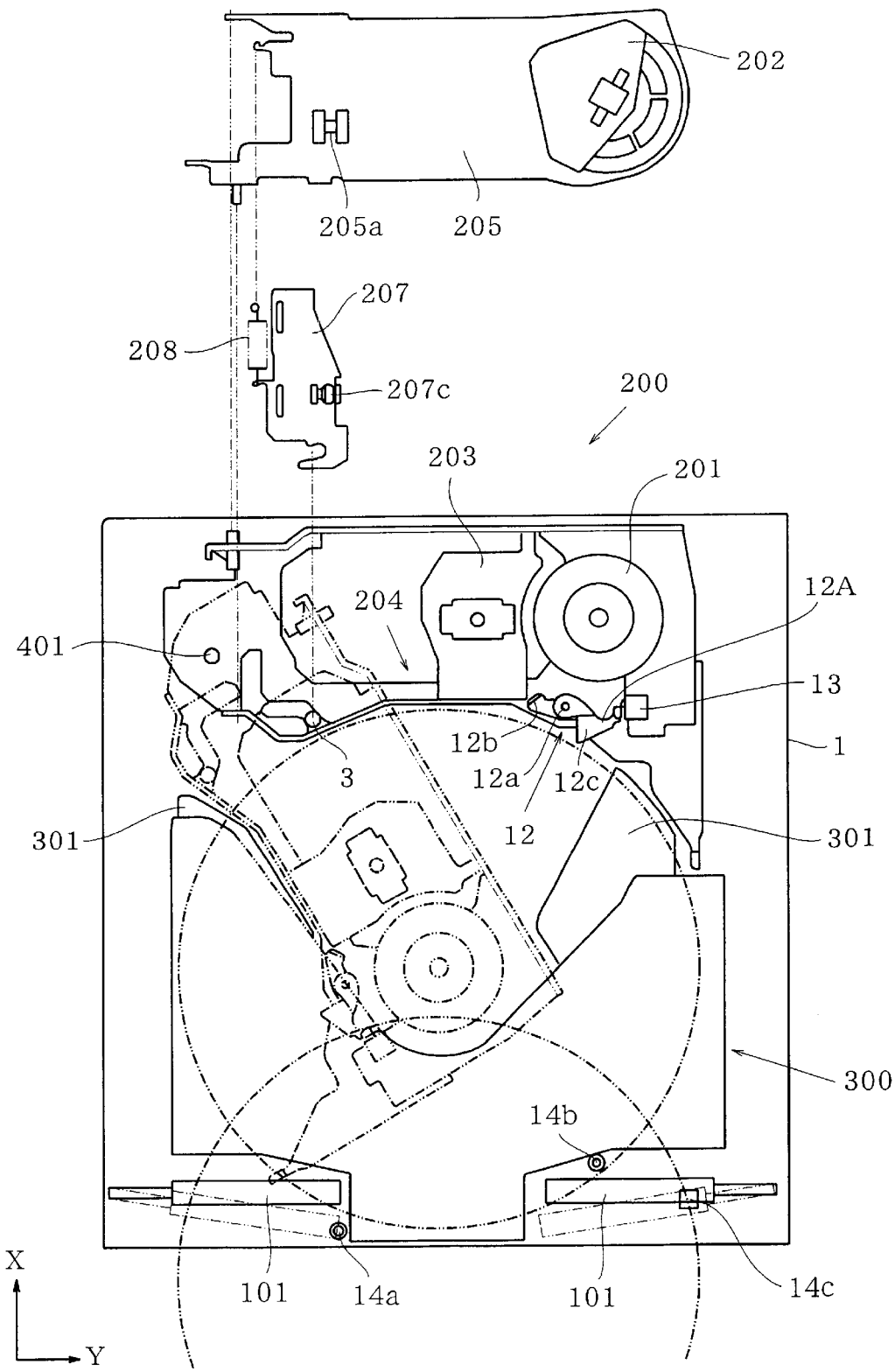
FIG. 2 is an explanatory view indicating some important portions of the disc reproducing apparatus.
Figure 3:
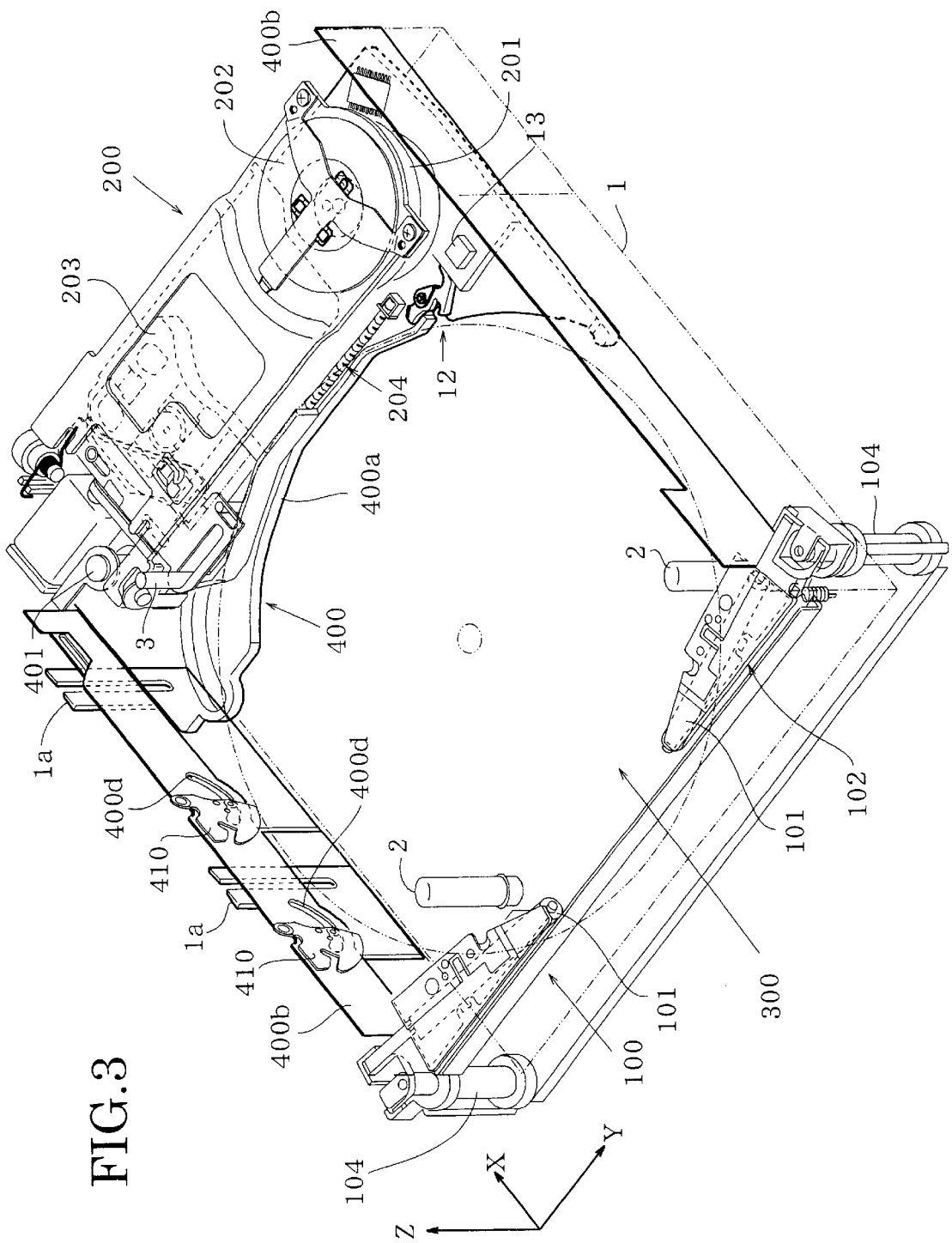
FIG. 3 is a perspective view indicating the disc reproducing apparatus of the present invention, with some portions thereof omitted for an easy description of the apparatus.

Referring to FIG. 2, a pair of disc driving rollers 101 are provided within the reproducing apparatus A, located near both ends of the elongated opening 11. Each of the disc driving rollers 101 is arranged horizontally in parallel with the disc transporting direction, and is rotatable in either direction so as to assist a disc in its movement into and from the apparatus A. Further, each roller 101 is allowed to make a semi-circular turning about a support post 104 (FIG. 3). In addition, the surface of each roller 104 is formed into a tapered shape being gradually sharpened towards the center line of the disc movement, in order that a disc being transported is sure to be moved along the center line.

Referring again to FIG. 1, the reproducing apparatus A has a disc holder 300 provided close to the front side of the apparatus. The disc holder 300 has a plurality of trays 301 arranged in a direction Z, with each tray 301 being able to hold one disc.

Further referring to FIG. 1, a disc reproducing section 200 is provided within the reproducing apparatus A close to the rear side thereof. A pair of slide plates 5 and 6 are provided left and right on the outsides of the main chassis 1 in a manner such that they are movable back and forth in a direction X. A movable chassis 400 (FIGS. 1 and 3) is provided to be movable vertically by virtue of a driving force from the slide plates 5 and 6. In fact, the reproducing section 200 is mounted on the movable chassis 400 so that it is horizontally pivotable about a support shaft 401 (FIGS. 1 and 3) by moving a movable pin 3.

Referring to FIG. 2, the reproducing section 200 comprises a turntable 201 for mounting an optical disc, an optical pickup 203 for reproducing the information recorded on the disc, a pickup moving device 204 for slidingly moving the pickup 203 in the radio direction of the disc, a switching member 12 and a detecting switch 13 which are capable of detecting an innermost circumferential position in order that the pickup 203 can exactly stop at the innermost circumferential position of the disc, and are also capable of detecting the loading of a disc in a predetermined position.

Further, the reproducing section 200 includes a clamper 202, one end of which is pivotably supported on the disc reproducing section 200, and the other end of which is made capable of downwardly pressing a disc so as to clamp it at a predetermined position.

As shown in FIG. 2, photo-sensors 14a and 14b are provided in the vicinity of the elongated opening 11 to detect the movement of the discs. In detail, the photo-sensor 14a is located at a position slightly away from the underside of a loaded disc, the photo-sensor 14b is located at a position slightly away from the underside of the disc holder 300, but just on the underside of the loaded disc. Further, a photo-sensor switch 14c is located in the vicinity of one driving roller 101. With the use of the photo-sensor 14a and the photo-sensor switch 14c, it is allowed to detect whether a disc is a 12-cm disc or a 8-cm disc.

Referring again to FIG. 2, reference numeral 207 is used to represent a clamping means which can move a clamper base 205 by virtue of the movement of the movable pin 3 and can press the damper 202 so as to effect a downward pivoting movement thereof. In detail, the clamping means 207 is connected through a coil spring 208 to the clamper base 205 which is in fact a main body of the damper 202.

Referring to FIG. 3, the main chassis 1 is used to support the disc transporting mechanism 100 including the pair of disc driving rollers 101, the disc reproducing section 200, the disc holder 300, and a tray moving mechanism for moving the trays 301.

As shown in FIG. 4, the disc transporting mechanism 100 is used to move a disc (inserted inwardly through the elongated opening 11) to the disc holder 300, and to move a disc from the disc holder 300 to the outside of the reproducing apparatus A so as to discharge said disc.

A disc inserted through the elongated opening 11 into a disc transport passage 102, gets in contact with the pair of driving rollers 101 arranged in parallel to a direction Y and positioned under the disc transport passage 102, thereby enabling the disc to be transported in a direction X.

Figure 5:
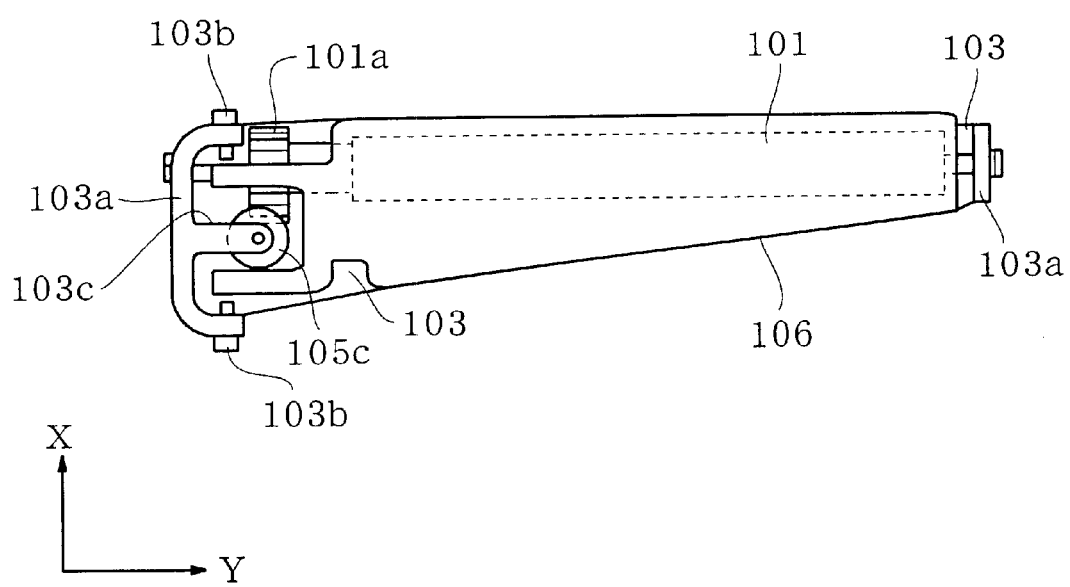
FIG. 5 is a bottom plane view indicating part of a disc transporting mechanism used in the disc reproducing apparatus.

Further, the pair of driving rollers 101 are freely pivotably supported by a pair of support chassis 103 (FIGS. 4A and 5). The two support chassis 103 are in turn pivotable about the support posts 104 by virtue of a roller moving mechanism which will be described in detail later.

As shown in FIG. 5, each driving roller 101 is provided at one end thereof with a gear 101a which is coaxial with the roller 101. Each support chassis 103 has a pair of upright plates 103a (FIGS. 4A and 5) and is provided under the driving roller 101, so that both ends of each driving roller 101 may be rotatably supported by the pair of the upright plates 103a.

As shown in FIG. 4A, a pair of disc passage restriction members 106 are provided above the pair of driving rollers 101, and are supported so that each restriction member 106 is freely pivotable about a fulcrum 103b. In this way, a narrow space formed between the restriction members 106 and the driving rollers 101 may be used as a disc transport passage. Further, coil springs 107 are provided between restriction members 106 and support chassis 103, so that the restriction members 106 are urged towards the driving rollers 101.

As shown in FIGS. 4A to 4C, a pair of pivoting members 105 are provided on both ends of the main chassis 1, with each being pivotable about a shaft 104. One end of each pivoting member 105 is pivotably supported on the main chassis 1 and the other end thereof is pivotably supported by a support chassis 103. In fact, each pivotal member 105 is partially inserted in a hole (not shown) formed on the support chassis 103. A gear portion 105c (FIGS. 4A and 5) is formed on the upper end of each pivoting member 105, and is engaged with a corresponding gear portion 101a coaxial with a driving roller 101.

Figure 8:
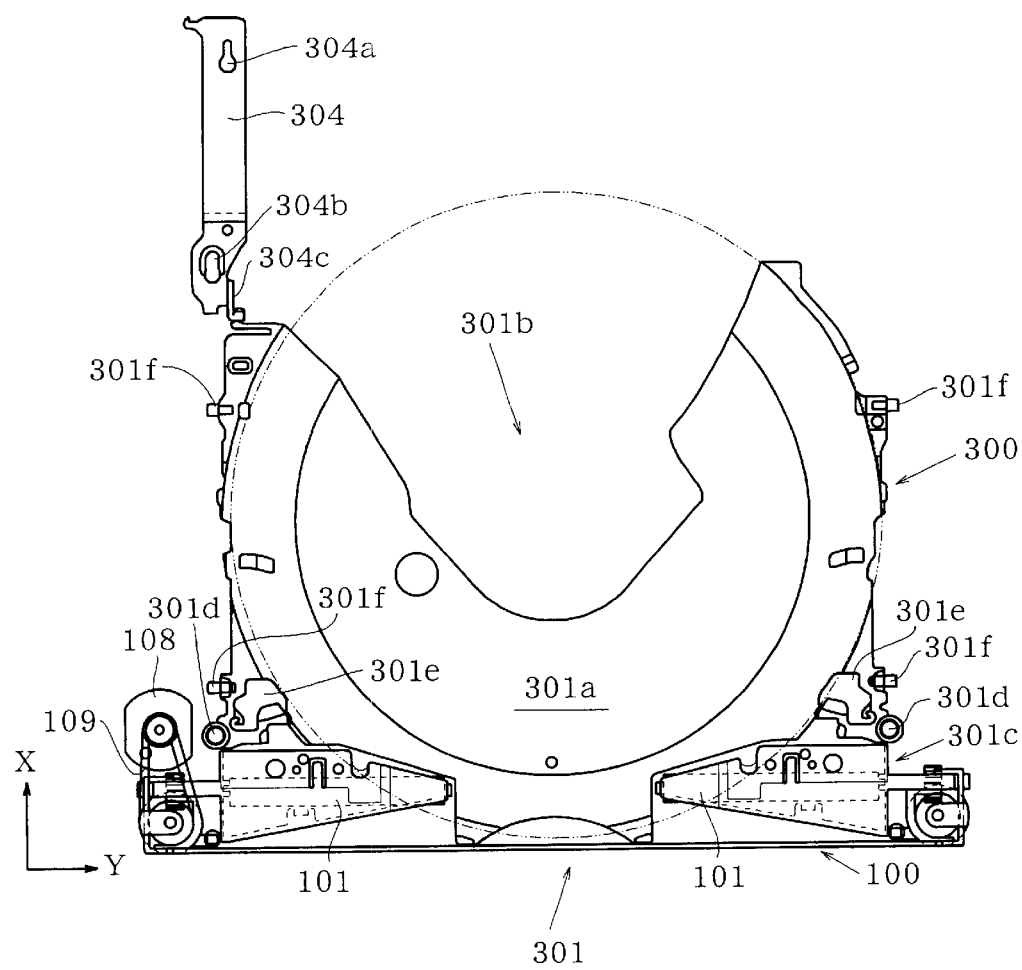
FIG. 8 is a plane view indicating a relationship between the disc transporting mechanism and the disc holder.

Referring again to FIG. 4A, one of the two pivoting members 105 has a driving force transmitting pulley 105a, so that a driving force from a motor 108 (FIG. 8) may be transmitted hereto through a belt 109 (FIG. 8). Further, another sort of pulley 105b is provided on the lower side of each pivoting member 105. In this way, the pair of the pivoting members 105 are allowed to be driven in synchronism with one another. Therefore, with the use of such a structure, a driving force from single one motor may be smoothly transmitted to the two driving rollers 101.

FIG. 4B is used to illustrate one example of the internal structure of a pivoting member 105. As shown in FIG. 4B, the outer surface of a support shaft 104 provided upright on the main chassis 1 is in slidable contact with the inner surface of the pivoting member 105. FIG. 4C is used to illustrate another example of the internal structure of a pivoting member 105. As shown in FIG. 4C, two annular projections 104a are formed upper and down on the support shaft 104, so as to get sliding contact with the inner surface of the pivoting member 105. A middle portion 104b between the two annular projections 104a has a smaller diameter than the annular projections 104a, and an amount of grease is allowed to be introduced into an annular space formed between the middle portion 104b and the inner surface of the pivoting member 105. In this way, it is sure to reduce an undesired friction resistance occurring within the pivoting member 105.

Further, each support chassis 103 has a downwardly projected member 103c, as shown in FIG. 4A. A movable member 110 having a flat U-shape section (FIG. 4A) is provided on the main chassis 1, which is movable in a direction X. In detail, the movable member 110 is engaged with two downwardly projected members 103c. With the use of such arrangement, when the movable member 110 is moved in a direction X, each support chassis 103 will pivot about a shaft 104, and each driving roller 101 will also pivot about a shaft 104. At this moment, the gear 101a of the driving roller 101 is in engagement with the gear 105c of the pivoting member 105 (FIG. 5).

Figure 6:
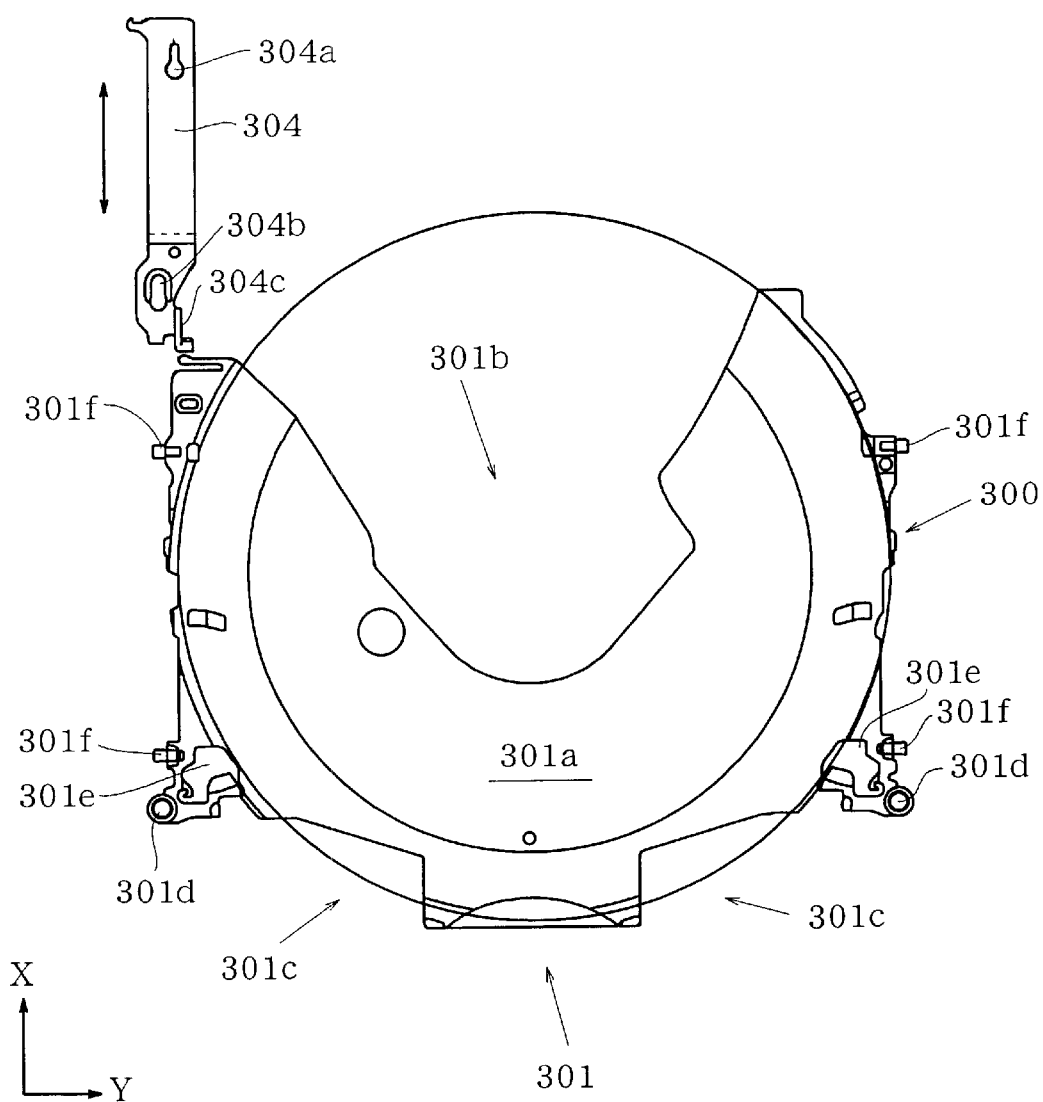
FIG. 6 is a plane view indicating a disc holder of the disc reproducing apparatus.
Figure 7:
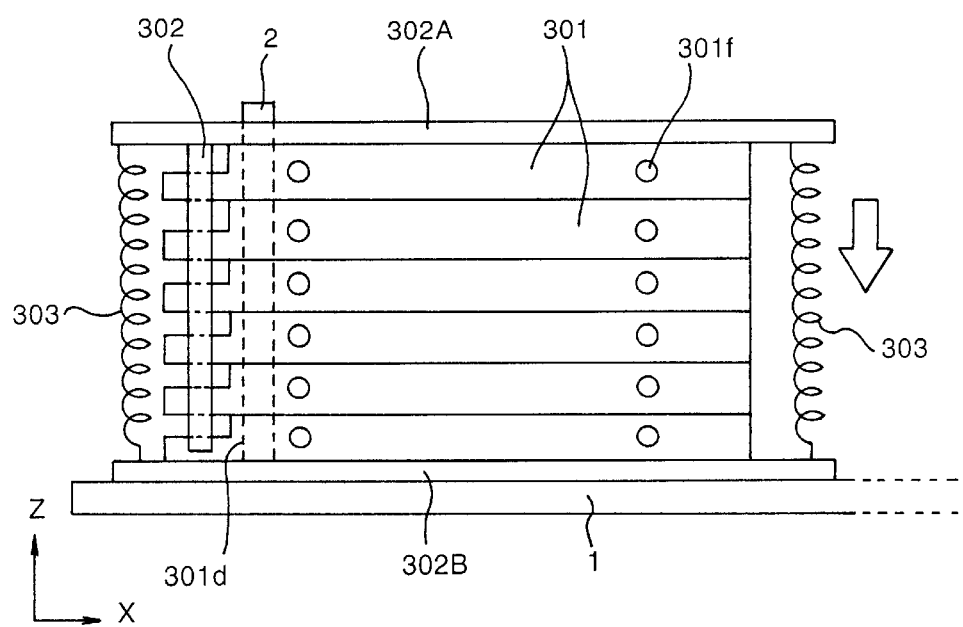
FIG. 7 is a side view indicating the disc holder of FIG. 6.

Referring to FIGS. 6 to 9, the disc holder 300 has a plurality of trays 301 arranged in a direction Z. Two guide rod 2 are provided upright on the main chassis 1. Each tray 301 is formed with two through holes 301d through which the two guide rods 2 are inserted so as to ensure that the trays 301 can move only in a direction Z (FIG. 7).

FIG. 6 is a plane view mainly showing the trays 301 of the disc holder 300. As shown in FIG. 6, each tray 301 has a generally V-shaped holding section 301a formed with one notch 301b and two notches 301c. The notch 301b has an area capable of coverring the center of a disc when the disc is held thereon, thereby allowing the enterring thereinto of the turntable 201, clamper 202 and the pickup 203 of the reproducing section 200.

The two notches 301c are formed right and left on the front side of the tray 301, thereby allowing the enterring of the two driving rollers 101.

In FIG. 6, reference numerals 301d are used to represent two through holes for the guide rods 2 to insert therethrough. Reference numerals 301e are used to represent two pressing means which can press the outer edge of a disc and thus fix the disc in a predetermined position by virtue of an elastic member (not shown).

Figure 10:
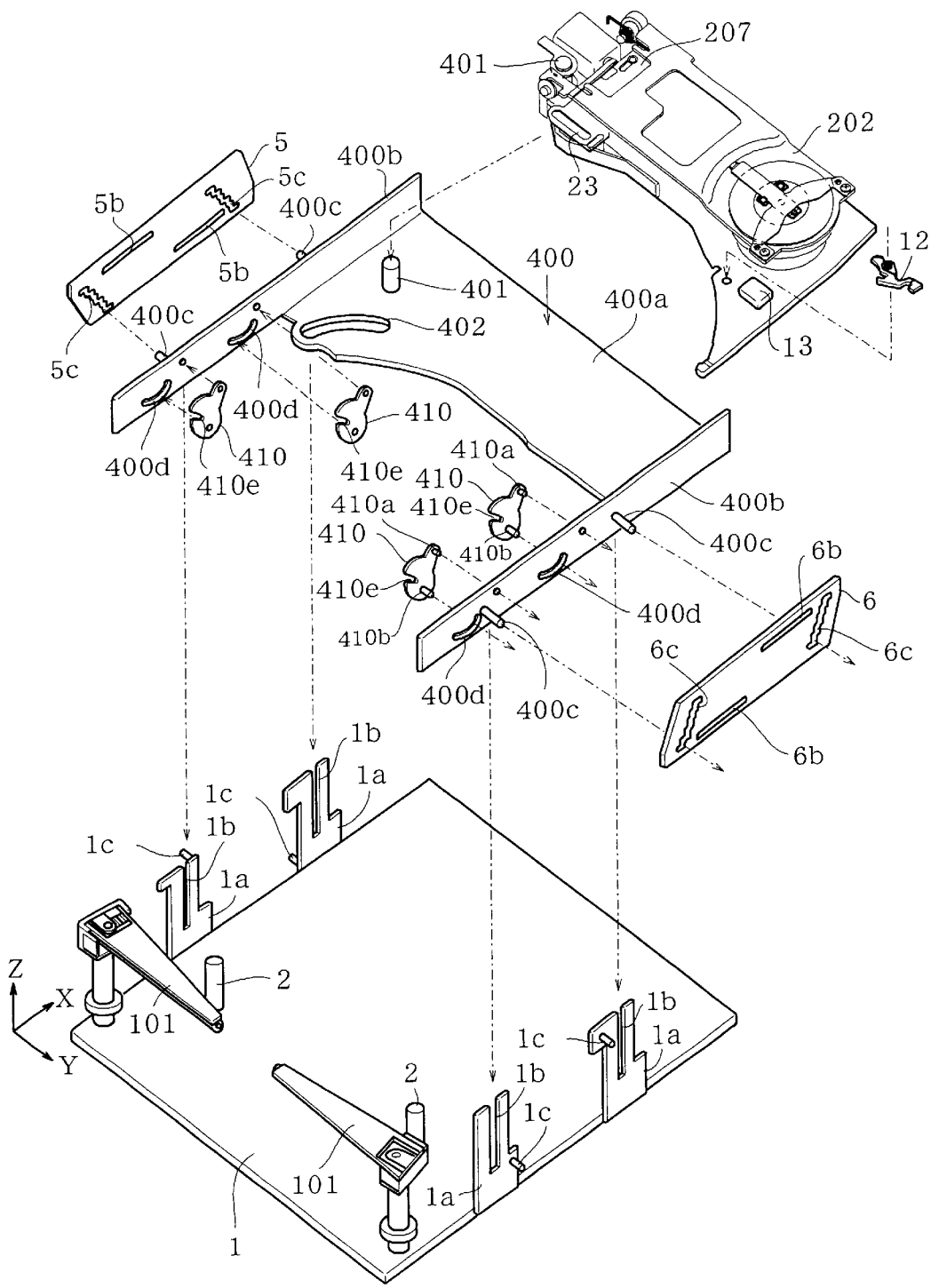
FIG. 10 is an exploded perspective view indicating the disc reproducing apparatus of the present invention.
Figure 24A:
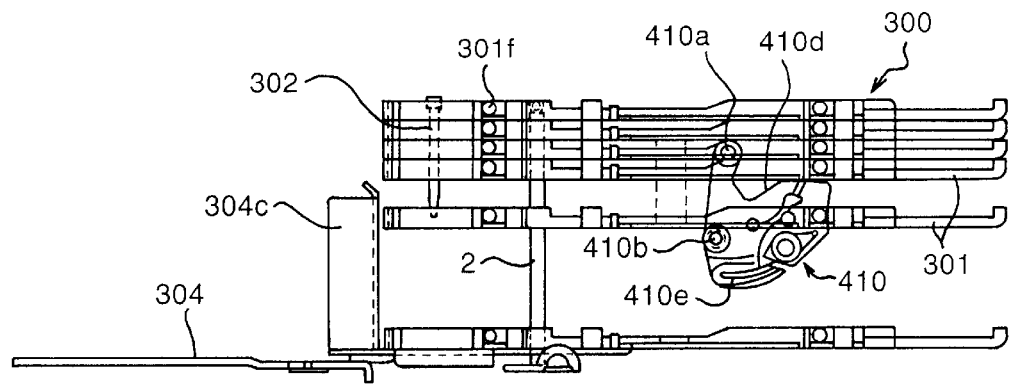
FIGS. 24A, 24B and 24C are side views indicating a relationship between a tray pressing member and the disc holder in the disc reproducing apparatus of the present invention.

Further, there are provided two projections 301f on both sides of each tray 301. Each projection 301f is adapted to receive a driving force from a wedge member 410 (FIG. 10). Moreover, there is provided (on the main chassis 1) a tray pressing means 304 for pressing against the edge of each tray 301. The tray pressing means 304 has two guide grooves 304a and 304b. Each of the two guide grooves 304a, 304b is allowed to be engaged by an engaging pin (not shown) protruding upwardly from the main chassis 1. When a disc is inserted into or removed from the disc holder 300, such engaging pins may be driven by a driving member (not shown) so as to move back and forth with respect to an edge portion of each tray 301. An engaging member 304c is provided at one end of the pressing means 304, forming an upright plate (FIG. 24) having a height suitable for transporting a tray, and capable of engaging with or disengaging from an edge portion of each tray.

FIG. 7 is a side elevation indicating the disc holder 300. As shown in FIG. 7, the disc holder 300 has six trays 301 arranged one upon another in a direction Z, with each tray 301 having two through holes 301d. The guide rods 2 are inserted through all these through holes 301d so that the six trays 301 may be desirably fixed in position. Further, a restriction plate 302A is provided on the top of the six trays 301, another restriction plate 302B is provided under the lowermost tray 301 on the main chassis 1. In this way, the six trays 301 may be restricted between the two restriction plates 302A and 302B. Moreover, each of the restriction plates 302A and 302B has two through holes into which the two guide rods 2 may be inserted so that the two restriction plates 302A and 302B can be properly fixed in position.

In detail, the restriction plate 302B is fixed on the main chassis 1. A plurality of coil springs 303 are provided at several positions between the two restriction plates 302A and 302B, so that the two restriction plates 302A and 302B are urged towards each other (shown by an arrow in FIG. 7) by virtue of the spring force of the coil springs 303. In addition, a plurality of downwardly extending elongate members 302 are provided to engage against the side faces of the six trays, so that the trays 301 may be prevented from an undesired movement in either a direction X or a direction Y.

With the use of the above arrangement, the six trays 301 may be at first interposed between the two restriction plates 302A and 302B, and coil springs 303 may then be attached in their predetermined positions, followed by insertion of the guide rods 2 through the holes 301d formed in all the trays 301 and the restriction plates 302A, 302B. Finally, the lower restriction plates 302B is fixed on to the main chassis 1, thereby completing the assembling operation of the six trays 301.

Figure 9:
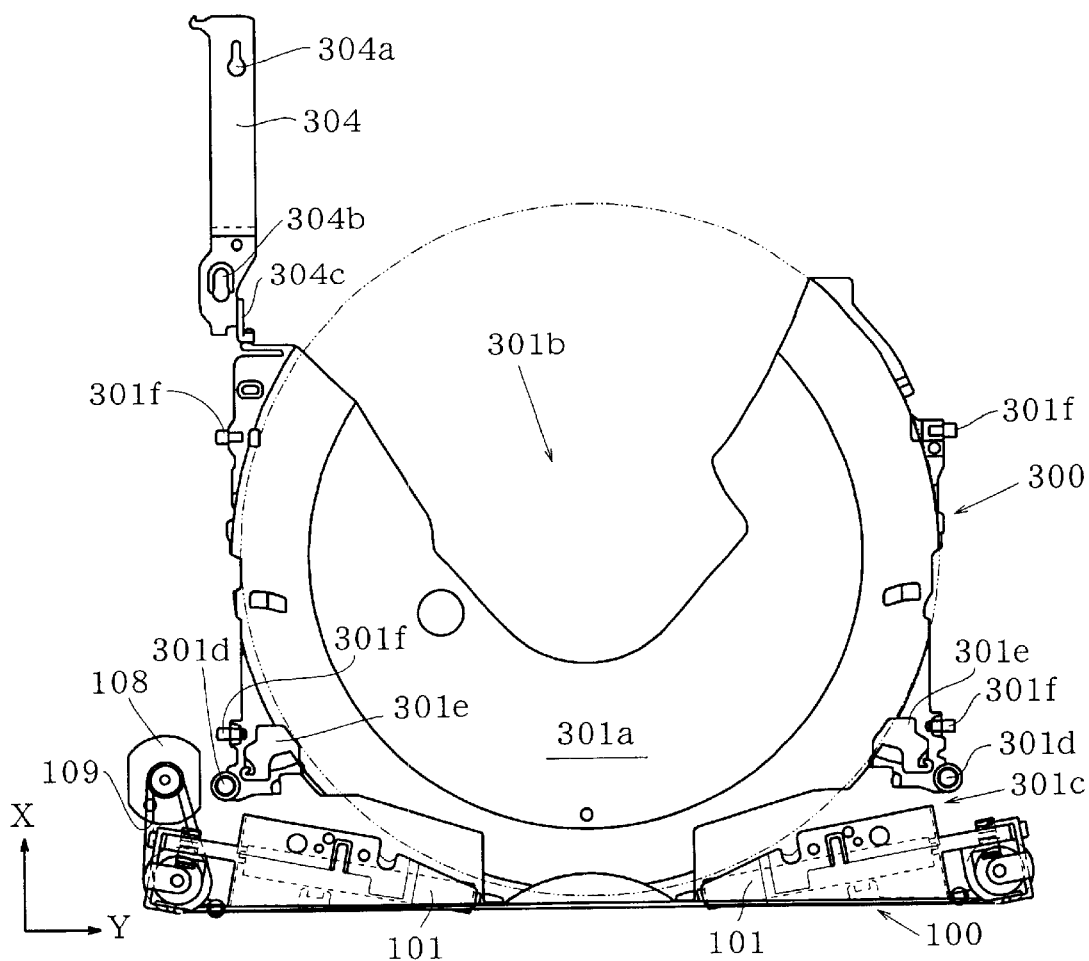
FIG. 9 is a plane view indicating a relationship between the disc transporting mechanism and the disc holder.

Here, with the use of the driving roller moving mechanism and with the use of the notches 301c of the trays 301, the pair of driving rollers 101, 101 are allowed to pivot between their projected positions (for transporting a disc, shown in FIG. 8) and their retracted positions (not for transporting a disc, shown in FIG. 9).

As shown in FIG. 8, when a disc is being transported, the pair of driving rollers 101 are caused to project into the notches 301c of a tray 301. At this moment, the two driving rollers 101, 101 are generally in parallel with the elongated opening 11, and its driving force is caused to act in the direction X (disc transporting direction). In this way, the two driving rollers 101, 101 are in the same area as occupied by the disc, so that a possible movement of the disc in the direction Z may be prevented. At this time, the tray pressing means 304 is in engagement with the edge of the tray 301.

As shown in FIG. 9, when a disc is not being transported, the pair of driving rollers 101 are caused to retract from the notches 301c of the tray 301. At this moment, the two driving rollers 101, 101 are generally not in parallel with the elongated opening 11, and are not in the same area as occupied by the disc.

In fact, a disc is reproduced under a condition shown in FIG. 9, so that it may be reproduced in a predetermined manner without being hampered by the driving rollers 101. Further, under a condition shown in FIG. 9, since the tray pressing means 304 is allowed to slide along the guide grooves 304a and 304b, the tray pressing member 304 will get engaged with the edge of the tray 301, thereby preventing any undesired vibration of the tray 301.

Referring to FIG. 10, the movable chassis 400 includes a flat-plate 400a mounting the disc reproducing section 200, and a pair of side plates 400b provided on both sides of the flat-plate 400a. Each side plate 400b is provided with two pivotable wedge members 410 which are simultaneously pivotable by virtue of a driving mechanism (not shown). Therefore, there are four wedge members in all which, together with the driving mechanism, forms a tray holding mechanism.

Figure 11:
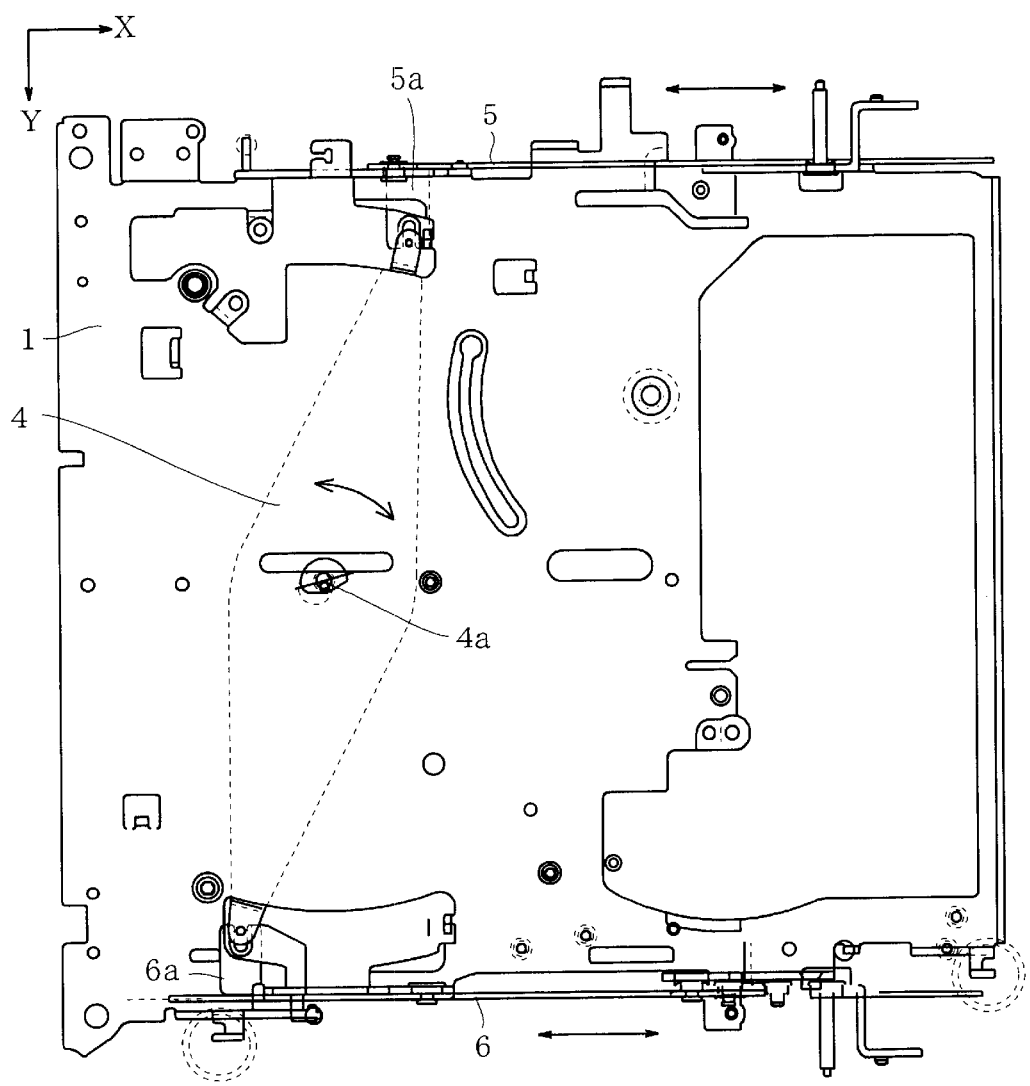
FIG. 11 is a bottom view of the apparatus of FIG. 10.
Figure 12:
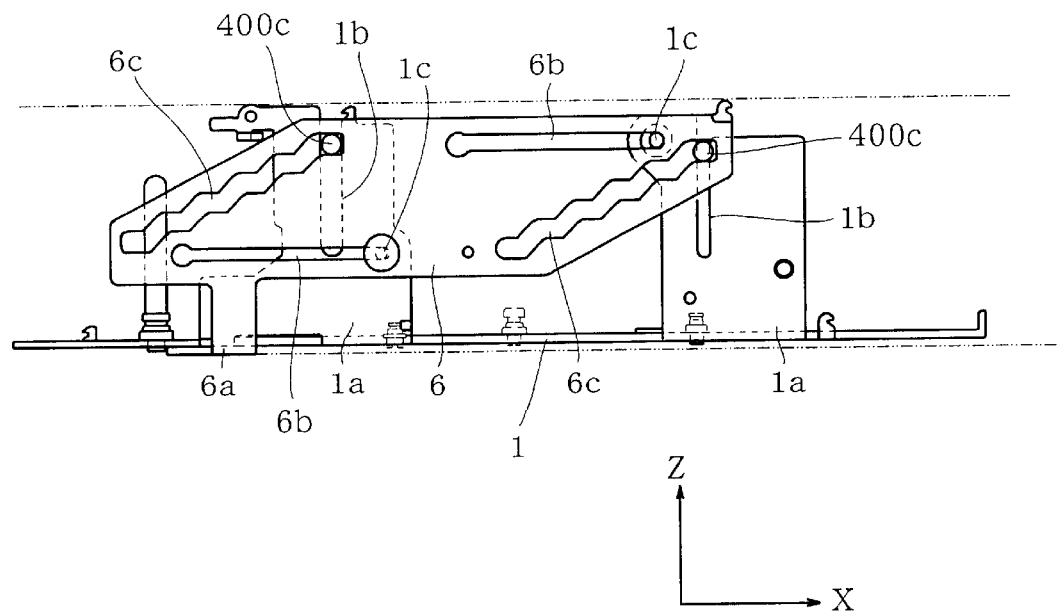
FIG. 12 is a side view of the apparatus of FIG. 10.

FIG. 11 and FIG. 12 are used to indicate a moving mechanism for moving the movable chassis 400.

FIG. 11 is a plain view indicating the main chassis 1.

As shown in FIG. 11, a pivoting arm 4 is freely pivotably installed on the inner surface of the bottom of the main chassis 1, with a fulcrum 4a serving as a pivot center. The pivoting arm 4 is driven by a driving force from a motor (not shown). Further, the main chassis 1 has four upright plates 1a provided on left and right sides of the chassis 1 (FIG. 10). Sliding plates 5 and 6 are provided to be able to move along the upright plates 1a in the direction X (FIGS. 10 and 11). Further, the slide plates 5 and 6 are provided with small plates 5a and 6a protruding in the direction Y (FIG. 11). The small plates 5a and 6a are pivotably connected with the both ends of the pivoting arm 4. In this way, when the pivoting arm 4 is driven by a driving force from a motor (not shown), the slide plates 5 and 6 will be caused to move in mutually opposite directions (but all in the direction X shown in FIGS. 10 and 11).

FIG. 12 is a side view illustrating the slide plate 6. As shown in FIG. 12, the slide plate 6 has two elongated holes 6b arranged in the direction X, each of which is engaged by a pin 1c formed on each upright plate 1a on the right side (FIG. 10). In this way, the sliding movement of the plate 6 in the direction X may be properly restricted.

Referring again to FIG. 10, each upright plate 1a has an elongated guide groove 1b, so that there are four elongated grooves 1b in all since there are four upright plates 1a. On the other hand, the movable chassis 400 has a pair of side plates 400b each having two fixed pins 400c. By engaging the pins 400c in the elongate guide grooves 1b, it is allowed to properly restrict the movement of the movable chassis 400 in the direction Z. Further, the two pins 400c of the right side plate 400b are also engaged in two inclined stairway-like elongated holes 6c formed on the slide plate 6. Accordingly, when the slide plate 6 is moved in the direction X, the pins 400c will be forced to move in the direction Z. Similarly, the two pins 400c of the left side plate 400b are also engaged in two inclined stairway-like elongated holes 5c formed on the slide plate 5 (FIG. 10). In this way, when the pair of the slide plates 5 and 6 are moved in the direction X, the four pins 400c will be caused to move in the direction Z, thereby causing the movable chassis 400 to move in the vertical direction (the direction Z).

Figure 13:
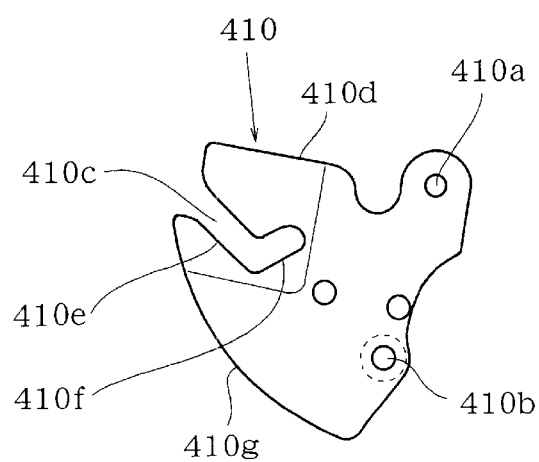
FIG. 13 is an explanatory view indicating a wedge member used in the disc reproducing apparatus of the present invention.

FIG. 13 is used to illustrate one of the wedge members 410 pivotably attached on the side plates 400b of the movable chassis 400. In FIG. 13, reference numeral 410a is a pivotal fulcrum, reference number 410b is a projection adapted to slidably engage into one of arc-shaped grooves 400d formed on each side plate 400b. By virtue of the slidable engagement of the arc-shaped grooves 400d with the projections 410b, the pivoting movement of the wedge members 410 may be properly restricted.

In FIG. 13, reference numeral 410c is a generally L-shaped groove formed on each wedge member 410, while reference numerals 410d, 410e, 410f, 410g are all cam surfaces engageable with the projections 301f of the disc trays 301. As related in the above, the four wedge members 410 are pivotable at the same time by virtue of an interlock mechanism (not shown).

The disc reproducing section 200 will be described in the following, with reference to FIGS. 14 to 16.

Figure 14:
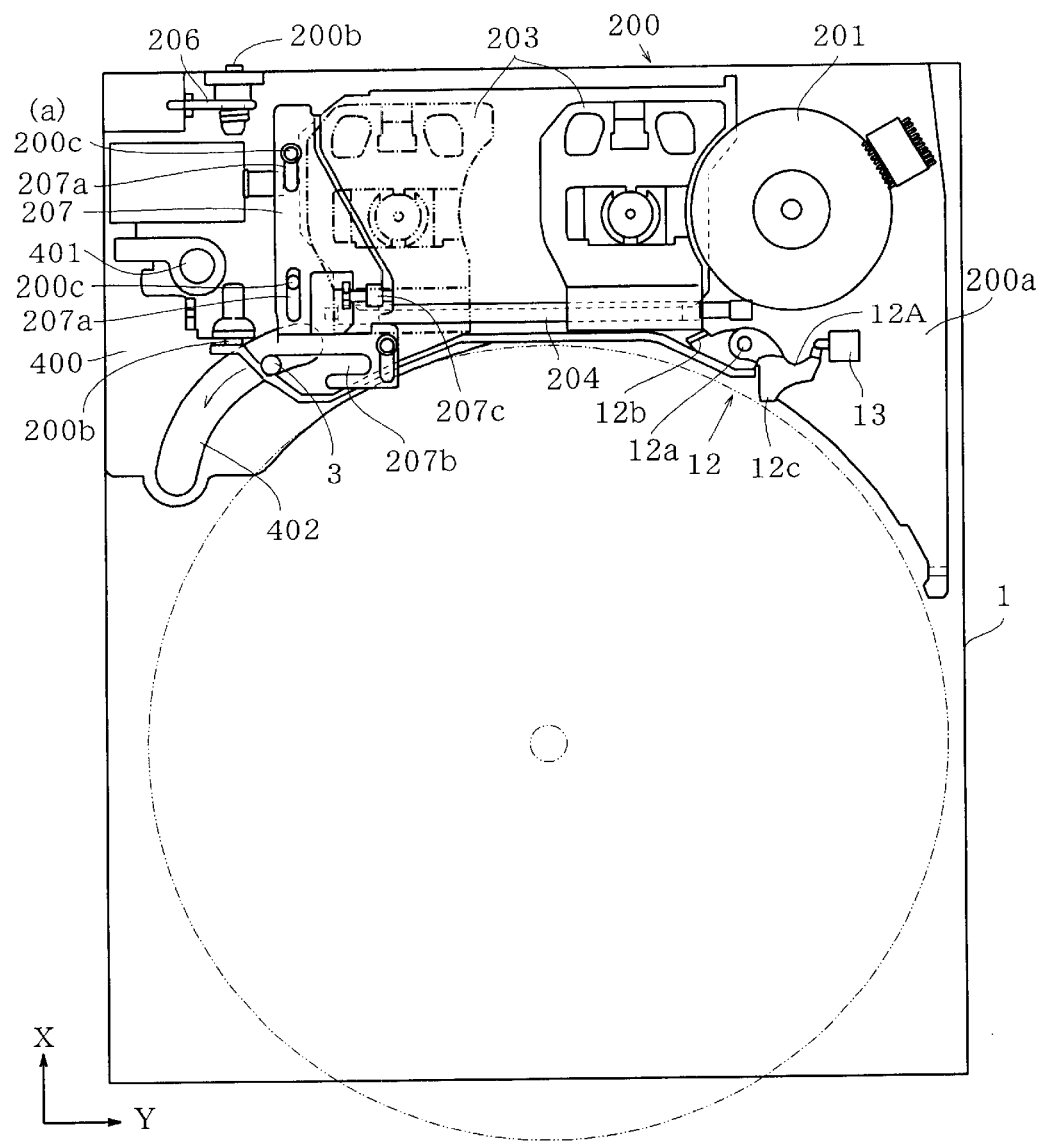
FIG. 14A is a plane view indicating a disc reproducing section of the apparatus of the present invention.
FIG. 14B is an explanatory view indicating a part of the disc reproducing section.
Figure 14:
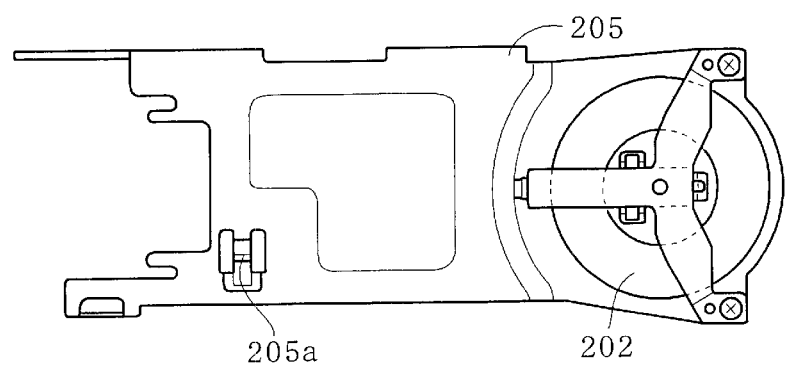
Figure 15:
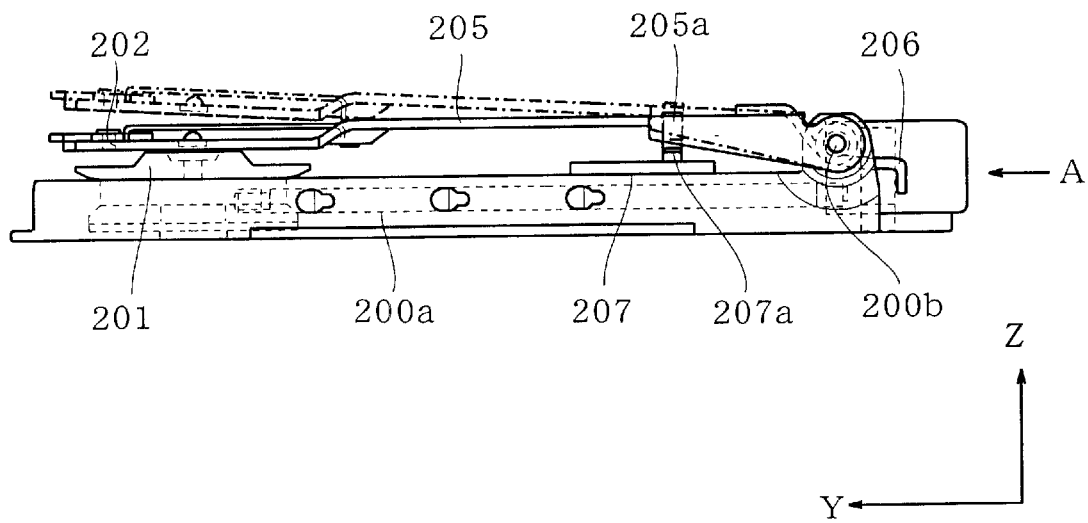
FIG. 15A is an explanatory view indicating a clamping action of the disc reproducing section.
FIGS. 15B and 15C are views indicating part of the action shown in FIG. 15A.
Figure 15:
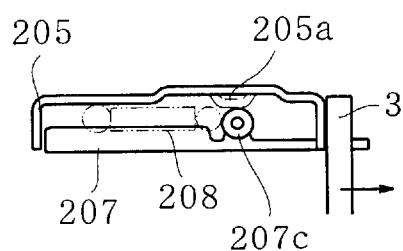
Figure 15:
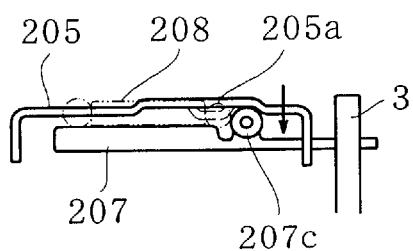

Referring to FIG. 14, the disc reproducing section 200 is provided on the movable chassis 400 which is movable in the direction Z by virtue of the above-described mechanism. Thus, the disc reproducing section 200 is also movable in the direction Z. Further, the disc reproducing section 200 is pivotable about a shaft 401 erected on the movable chassis 400, so that the reproducing section 200 is allowed to pivot between a reproducing position and a non-reproducing position by virtue of a mechanism (which will be described later).

As shown in FIG. 14A and FIG. 15A, a turntable 201, an optical pickup 203 and a pickup moving mechanism 204 are provided on the base 200a of the reproducing section 200. The base 200a is supported on the movable chassis 400 and is freely pivotable about the shaft 401. A clamper base 205 is provided on the above base 200a, and is freely pivotable (in the direction Z) about a pivot shaft 200b (FIG. 15A). A clamper 202 is held at the front end of the clamper base 205.

Further, as shown in FIG. 14B and FIG. 15A, the clamper base 205 has a converged portion 205a. Moreover, the pivot shaft 200b is provided with a spring 206. The spring 206 is used to produce an urging force to cause the clamper base 205 to be urged towards the base 200a of the reproducing section 200. With the use of such a spring 206, it is sure to obtain a clamping force for clamping a disc in a predetermined position.

Referring to FIG. 14A and FIGS. 15A–15C, a clamper effecting member 207 is provided on the base 200a of reproducing section 200. As shown in FIG. 16, the clamper effecting member 207 has two elongated holes 207a. The elongated holes 207a are engaged by the pins 200c erected on the base 200a. In this way, the clamper effecting member 207 is allowed to move in the axial direction of the pivot shaft 200b. Further, the clamper effecting member 207 has an elongated groove 207b arranged orthogonal to the elongated holes 207a.

Referring again to FIG. 2, the clamper effecting member 207 is connected through a coil spring 208 to the clamper base 205.

In fact, the coil spring 208 serves to act against the action of the spring 206, helping to release the clamping action effected by the spring 206.

Figure 16:
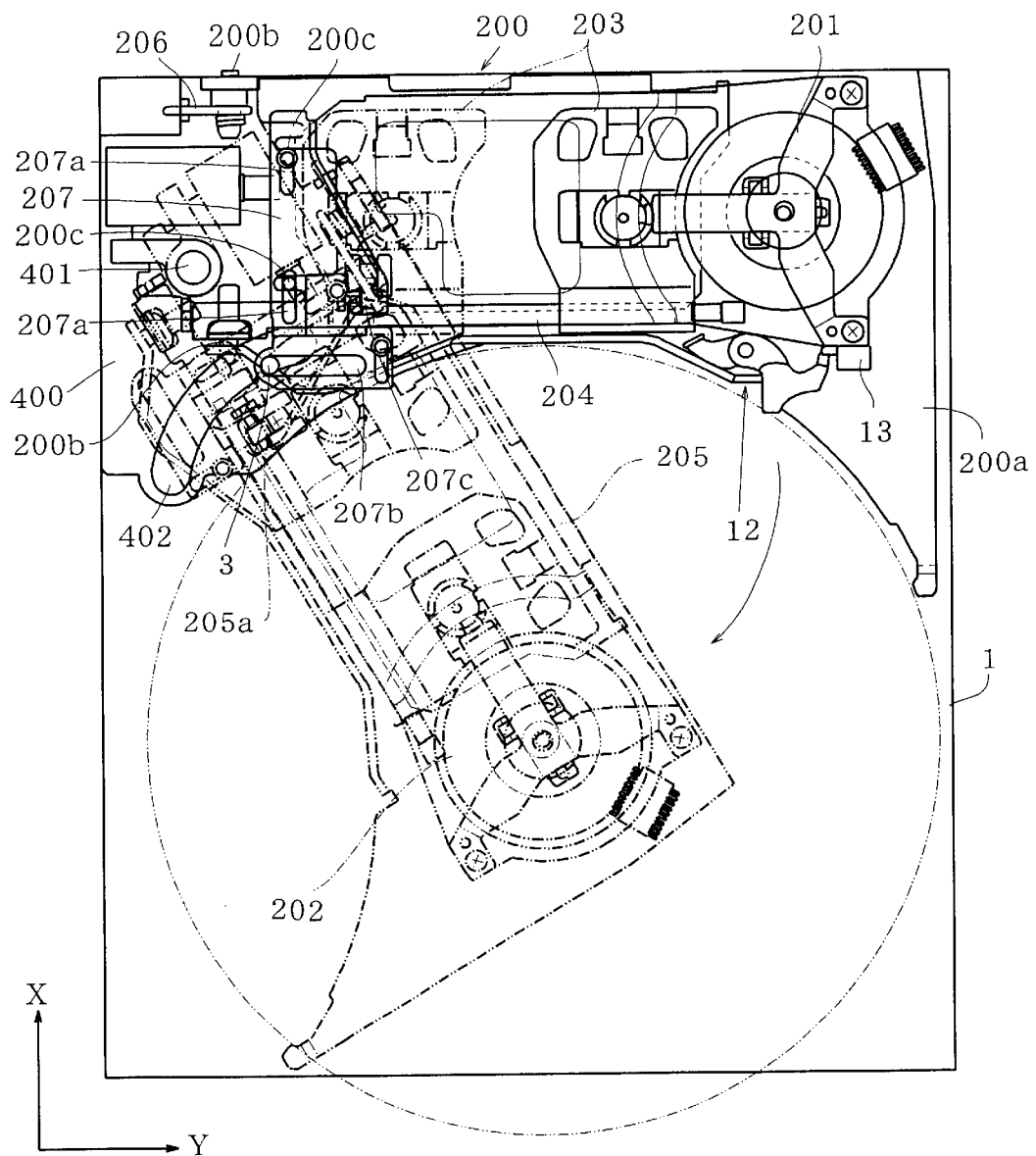
FIG. 16 is a plane view indicating a pivoting movement of the disc reproducing section.

Further, as shown in FIGS. 2, 14 and 16, a switching member 12 and a detecting switch 13 (operated by the switching member 12) are provided on the base 200a of the disc reproducing section 200. In detail, the switching member 12 is supported on the base 200a, in a manner such that it can be freely pivotable about the pivot shaft 12a in the horizontal plane and that it is urged in the clockwise direction by virtue of a coil spring (not shown) combined with the pivot shaft 12a. Moreover, the switching member 12 has an engaging member 12b located in the vicinity of the pickup 203. When an edge portion of the turntable 201 contacts the engaging member 12b, the switching member 12 will be caused to rotate (about the pivot shaft 12a) in the counter clockwise direction against the urging force of the coil spring (not shown), thereby switching ON the detecting switch 13.

Moreover, when the optical pickup 203 approaches a certain part of the turntable 201 corresponding to the innermost circumferential portion of a disc, this fact can also be detected easily by a contact between the pickup 203 and the engaging member 12.

Further, a switch arm 12A having an engaging portion 12c is provided on the other end of the switching member 12. In this way, when an outer edge portion of a disc transported hereto by the driving rollers 101 get in contact with the engaging portion 12c, the switching member 12 will also be caused to rotate (about the pivoting shaft 12a) in the counter clockwise direction against the urging force of the coil spring (not shown), thereby switching ON the detecting switch 13 so as to stop the driving rollers 101.

Referring again to FIGS. 10 and 14, the movable chassis 400 is formed with an arc-shaped groove 402, and a movable pin 3 is engaged in the arc-shaped groove 402. Further, the movable pin 3 is also engageable in an elongated groove 207b of the clamp effecting member 207. By virtue of the driving mechanism (not shown), the movable pin 3 will be caused to move along the arc-shaped groove 402.

By moving the movable pin 3 along the arc-shaped groove 402, the disc reproducing section 200 is allowed to pivot (turn) between a reproducing position and a non-reproducing position, and a desired disc clamping action can be effected. As shown in FIG. 14 and FIG. 15, when the disc reproducing section 200 is in a non-reproducing position, the converged portion 205a of the clamper base 205 is lying over the roller 207c of the clamp effecting member 207, so that the clamper 202 is separated from the turntable 201, i.e., a clamping action has been released.

Further, by virtue of a driving mechanism (not shown), the movable pin 3 may be moved along the arc-shaped groove 402 in a direction indicated by an arrow shown in FIG. 14A. In this way, the disc reproducing section 200 may be pivoted to a reproducing position indicated by 2-dot chain line shown in FIG. 16.

Immediately before the movable pin 3 arrives at the end of the arc-shaped groove 402, i.e., immediately before the disc reproducing section 200 is turned to its reproducing position, the movable pin 3 will be driven in a direction generally parallel with the elongated holes 207a of the clamp effecting member 207. In this way, the clamp effecting member 207 is allowed to have a displacement with respect to the base 200a of the reproducing section 200, in a longitudinal direction of the elongated holes 207a of the member 207. As a result, the the converged portion 205a of the clamper base 205 will move away from the roller 207c of the clamp effecting member 207, so that the clamper 202 will press against the turntable 201 by virtue of the urging force of the spring 206, thereby effecting a clamping action.

At this moment, since the displacement of the member 207 will cause the coil spring 208 to expand to some extent, the coil spring 208 itself will produce an urging force in its retracting direction, thereby urging the base 200a towards the reproducing position 200. In this way, it is possible to inhibit a possible clatterring of the base 200a when it is in the reproducing position, thereby ensuring a correct positioning of the disc reproducing section 200.

The operation of the disc reproducing apparatus made according to the present invention will be described in the following with reference to FIGS. 17 to 23.

When a disc is to be reproduced from its innermost circumferential position, the pickup 203 of the disc reproducing section 200 is moved by the pickup moving mechanism 204 so as to arrive at a position close to the turntable 201 and corresponding to the innermost circumferential position of the disc.

In this way, the pickup 203 contacts the engaging portion 12b of the switching member 12, so as to cause the switching member 12 to pivot in the counter clockwise direction, thereby switching ON the detecting switch 13. At this time, once it is detected that the pickup 203 is moving to a further inner circumferential position inwardly of the innermost circumferential position of the disc, the pickup moving mechanism 204 will be stopped immediately, thereby preventing the pickup 203 from bumping into the turntable 201. Then, the pickup 203 is caused to move back until the detecting switch 13 changes back to its OFF state, thereby preventing the exerting of an unnecessary load on the disc and the driving rollers 101.

Figure 17:
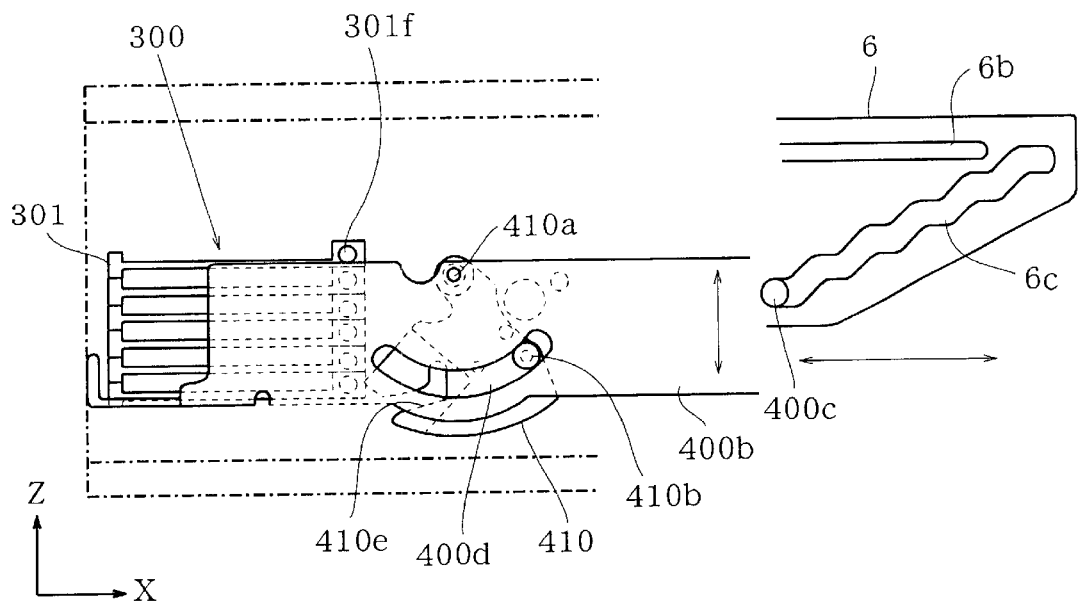
FIG. 17 is an explanatory view indicating an operation of the disc reproducing apparatus of the present invention.

Referring to FIG. 17, six disc trays 301 are arranged one upon another in the direction Z, the pins 400c are located at the lowermost positions of the inclined elongated holes 6c, with the movable chassis 400 being located at the lowermost position in the reproducing apparatus. At this time, each wedge member 410 is separated away from the trays 301, thereby avoiding a collision between the wedge members 410 and the disc trays 301 during the vertical movement of the movable chassis 400.

Figure 18:
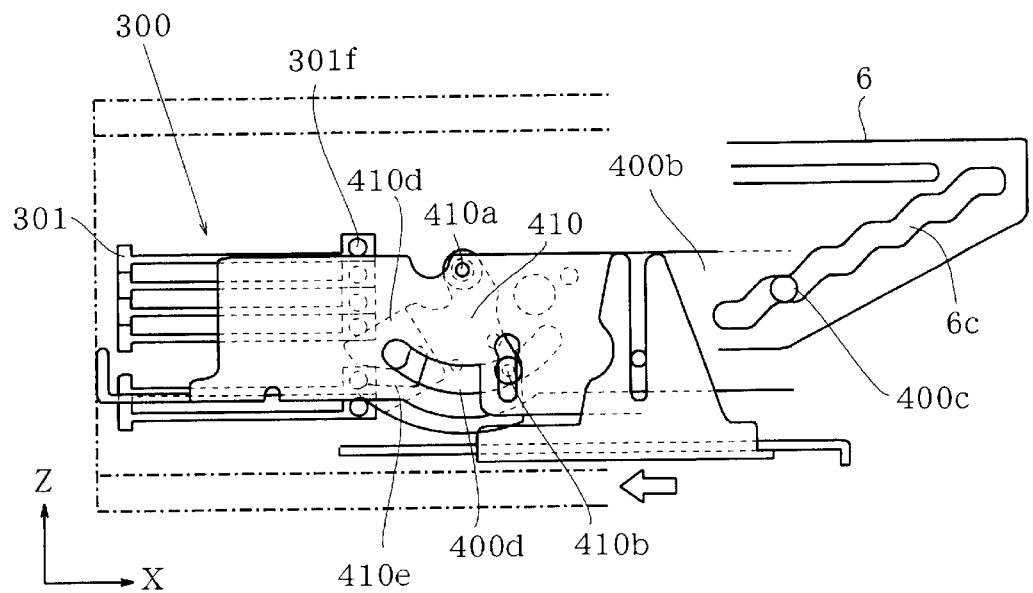
FIG. 18 is an explanatory view indicating an operation of the disc reproducing apparatus of the present invention.

Referring to FIG. 18, when the slide plates 5 and 6 are driven, the movable chassis 400 will be moved upwardly. After the pins 400c are moved upwardly by one step, the movable chassis 400 is stopped. At this height, the wedge members 410 are enabled to hold a second tray 301 (counting from below).

In fact, each of the inclined elongated holes 6c has six steps corresponding to six different heights of the six disc trays 301. For example, when the second tray 301 (counting from below) is to be held by the wedge members 401, the pins 400c are needed to be located at a second step (counting from below) of the inclined elongated holes 6c.

Referring again to FIG. 18, when the second tray 301 (counting from below) is to be held by the wedge members 401, the wedge members 401 are rotated in the counter clockwise direction. At this time, the cam surface 410d of each wedge member 410 will push upwardly against each projection 301f of a third tray 301 (counting from below), thereby upwardly moving the third to sixth trays 301 (counting from below). At this moment, each projection 301f of the second tray 301 (counting from below) is caused to move over the cam surface 410e of each wedge member 410 and further move into the groove hole 410c of the wedge member.

Then, the slide plates 5 and 6 are driven so as to move up the movable chassis 400. In this way, the third to sixth trays 301 (counting from below) are pushed upwardly by the cam surface 410d, the second tray 301 (counting from below) is also moved upwardly since it is pushed upwardly by the cam surface 410e. This time, only the lowermost tray 301 is remained at its original position.

Figure 19:
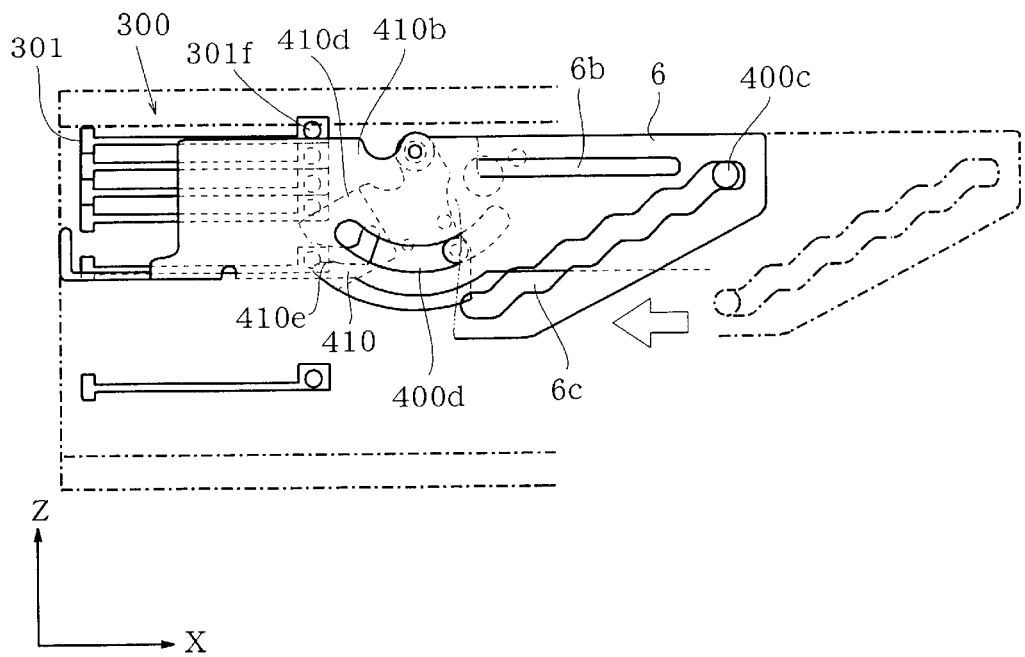
FIG. 19 is an explanatory view indicating an operation of the disc reproducing apparatus of the present invention.

After that, the movement of the movable chassis 400 is stopped under a condition shown in FIG. 19, with the pins 400c arriving at the uppermost steps of the inclined elongated holes 6c. Thus, the second tray 301 (counting from below) is held by the wedge members 410.

At this time, the second tray 301 (counting from below) is just at a height corresponding to the position of the driving rollers 101, suitable for inserting or discharging a disc.

Figure 24B:
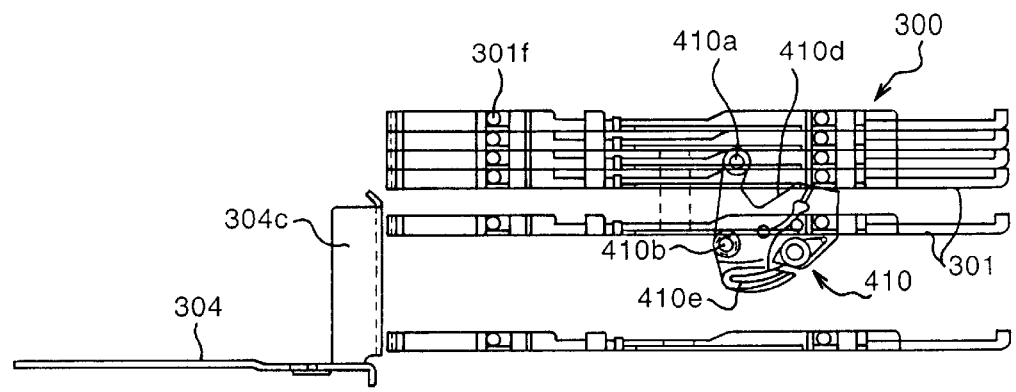
Figure 24C:
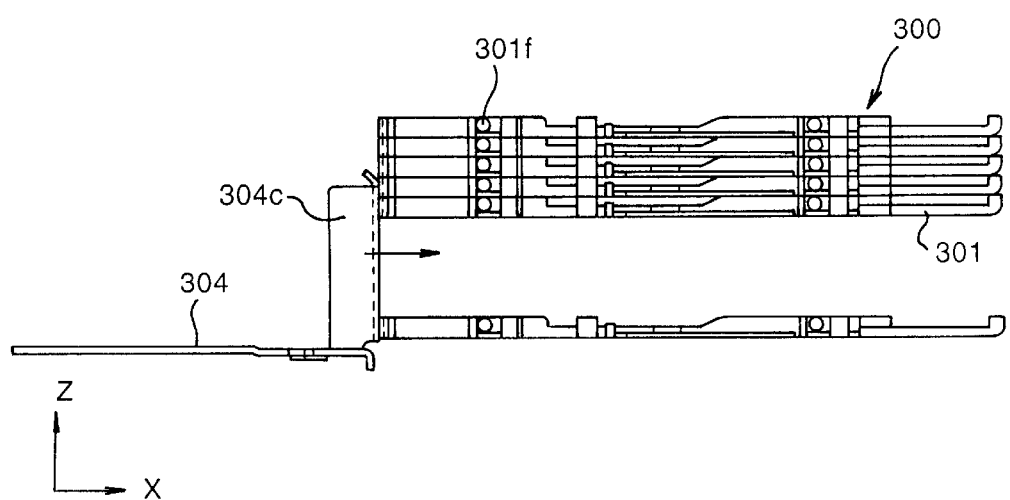
Figure 25:
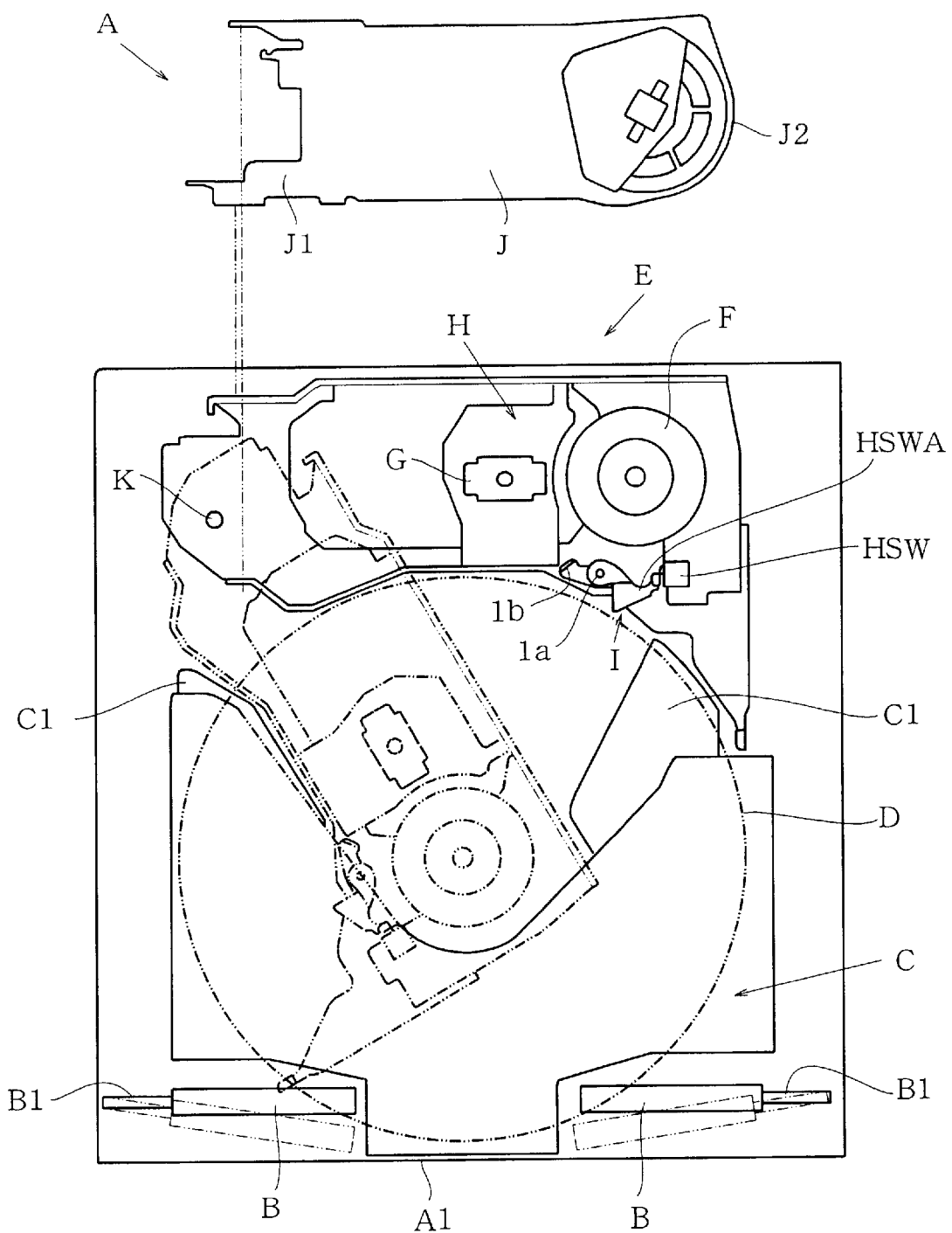
FIG. 25 is an explanatory view indicating a conventional disc reproducing apparatus.

At this moment, the tray pressing means 304 has not been moved to touch the trays 301, but kept at a position shown in FIG. 24B.

Figure 20:
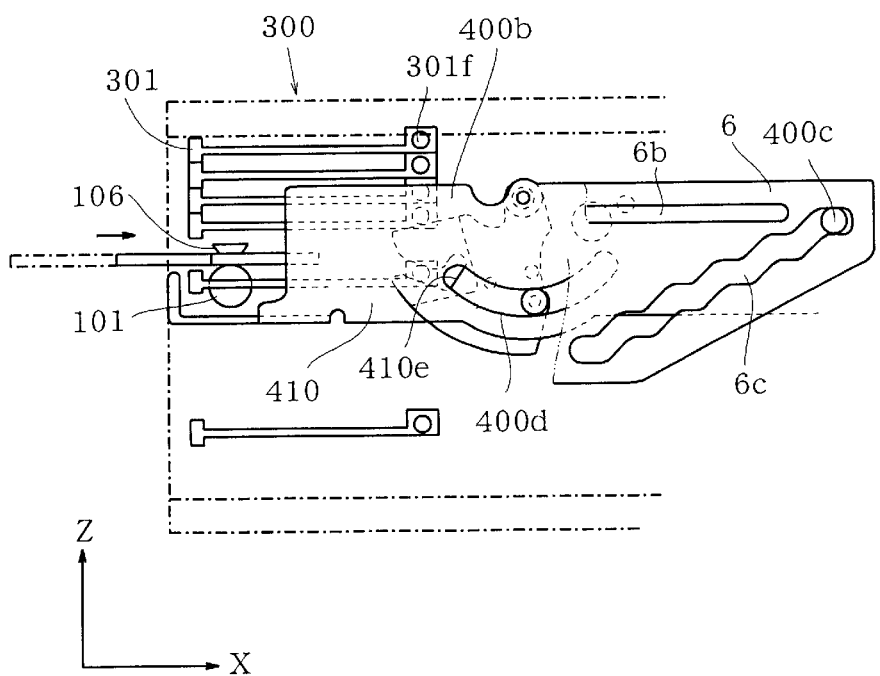
FIG. 20 is an explanatory view indicating an operation of the disc reproducing apparatus of the present invention.

Then, as shown in FIG. 20, each wedge member 410 is pivoted slightly in the clockwise direction. This time, although there is no change in the position of the second tray 301 (counting from below) held by the wedge members 410, the third to sixth trays 301 are pushed upwardly by the cam surface 410d of the wedge member 410. In this way, the pair of driving rollers 101 are allowed to enter between the trays 301, so that the two driving rollers 101 are moved from their positions shown in FIG. 9 to the positions shown in FIG. 8, thereby making it possible to transport a disc through the elongated opening 11.

Then, the tray pressing means 304 is slidingly moved to allow its engaging member 304c to get in touch with the edges of the trays 301, so as to prevent a clatterring of the trays 301, thereby ensuring a desired precision for the movement of the second tray 301 (counting from below). Further, since the tray pressing member 304 is in contact also with the edge of the lowermost tray 301, it is also possible to prevent a clatterring of the lowermost tray 301.

Subsequently, a disc may be inserted from the elongated opening 11, and such a disc insertion movement may be detected by the photo-sensor 14a, so that the driving rollers 101 will begin to effect the loading of a disc. At this moment, if the photo-sensor 14a and the photo-sensor switch 14c are not at their ON state simultaneously, it will be determined that a disc being loaded is an 8-cm disc and this disc will be ejected.

Further, a fact that a disc is being loaded will be detected by a photo-sensor 14b.

Then, the disc is moved to the second tray 301 (counting from below). When the edge of the disc comes into contact with the engaging portion 12c of the switch arm 12A, the switching member 12 will be caused to rotate in the counter clockwise direction (FIG. 14), thereby switching ON the detecting switch 13.

Figure 21:
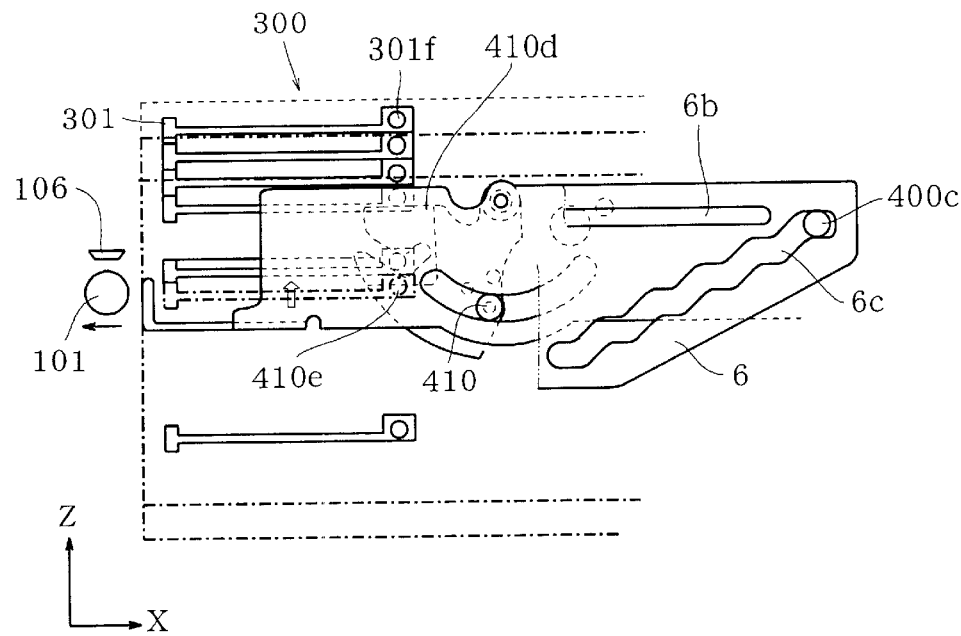
FIG. 21 is an explanatory view indicating an operation of the disc reproducing apparatus of the present invention.

Once the detecting switch 13 is switched ON, as shown in FIG. 21, the driving rollers 101 will be caused to retract from between the trays 301, without causing any movement of the disc towards the rollers 101. In this way, the disc is allowed to smoothly drop on to the second tray 301 (counting from below). Afterwards, the slide plates 5 and 6 are driven so that the movable chassis 400 is lowered. When the pins 400c arrive at the second step (counting from below) of the inclined holes 6c, the movable chassis 400 is stopped. At this time, the movable chassis 400 is at a position shown in FIG. 18. Further, the wedge members 410 are caused to rotate in the counter clockwise direction, so as to release the contact between the projections 301f of the trays 301 and the cam surfaces 410d and 410e of the wedge members 410.

Subsequently, the slide plates 5 and 6 are driven again so that the movable chassis 400 is lowered still further. When the pins 400c arrive at the lowermost positions of the inclined holes 6c, the movable chassis is stopped. At this time, the movable chassis 400 is at a position shown in FIG. 17. Up to this, a series of disc loading operations have thus been finished.

A disc mounted on any one of the trays 301 (for example, the second tray 301 counting from below) may be reproduced in the following, with reference to FIGS. 17, 18 and FIGS. 22, 23.

Starting from a condition shown in FIG. 17, when the disc mounted on the second tray 301 (counting from below) is to be reproduced, the movable chassis 400 is moved so that the disc reproducing section 200 is moved to a height corresponding to the second tray 301 (counting from below).

Namely, the slide plates 5 and 6 are driven so that the movable chassis 400 is moved upwardly until the pins 400c arrive at the second steps (counting from below) of the inclined elongated holes 6c. In this way, since the movable chassis 400 has been positioned at a height shown in FIG. 18, the disc mounted on the second tray 301 (counting from below) is in a reproducible condition.

After that, in order to ensure a necessary space between the disc trays 301 for the reproducing section 200 to enter thereinto, the wedge members 410 are caused to rotate in the clockwise direction, as shown in FIG. 18. Thus, the cam surface 410d of each wedge member 410 will push upwardly the projection 301f of the third tray (counting from below), thereby upwardly moving the third to sixth trays 301 (each counting from below).

Meanwhile, each projection 301f of the second tray 301 (counting from below) will move over the cam surface 410e and into the groove hole 410c of each wedge member 410. At this time, each projection 301f of the lowermost tray 301 will get in contact with the cam surface 410e of each wedge member 410.

Subsequently, the wedge members 410 are further rotated in the clockwise direction, thereby further upwardly moving the third to sixth trays 301 (each counting from below), as shown in FIG. 18. At this time, each projection 301f of the second tray 301 (counting from below) is raised up by the cam surface 410f, while each projection 301f of the lowermost tray 301 is pressed by the cam surface 410e so that the lowermost tray 301 is not moved. In this way, around the second tray 301 (counting from below), a space necessary for the disc reproducing section 200 to enter thereinto is thus formed, as shown in FIG. 18. This time, each projection 301f of the second tray 301 (counting from below) gets further deep into the groove hole 410c, so that the second tray 301 is firmly held by the wedge members 410.

Figure 22:
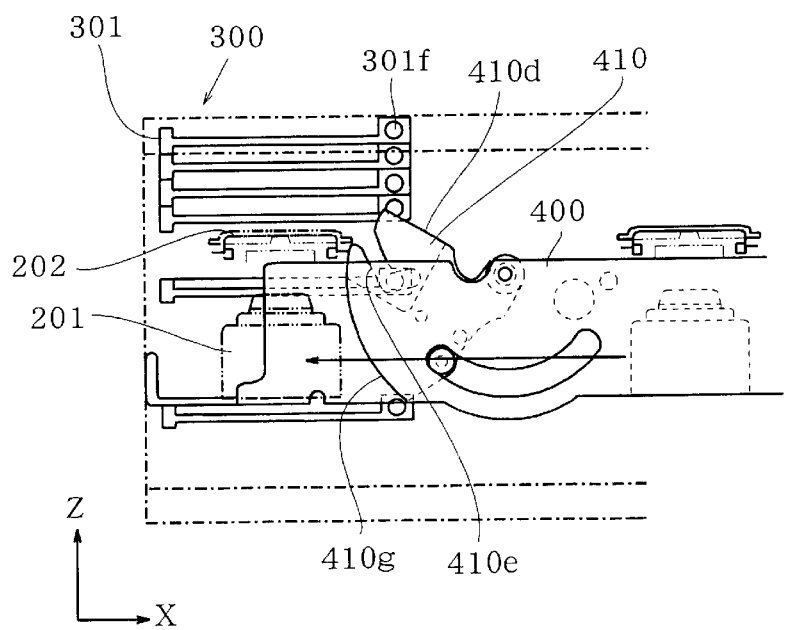
FIG. 22 is an explanatory view indicating an operation of the disc reproducing apparatus of the present invention.
Figure 23:
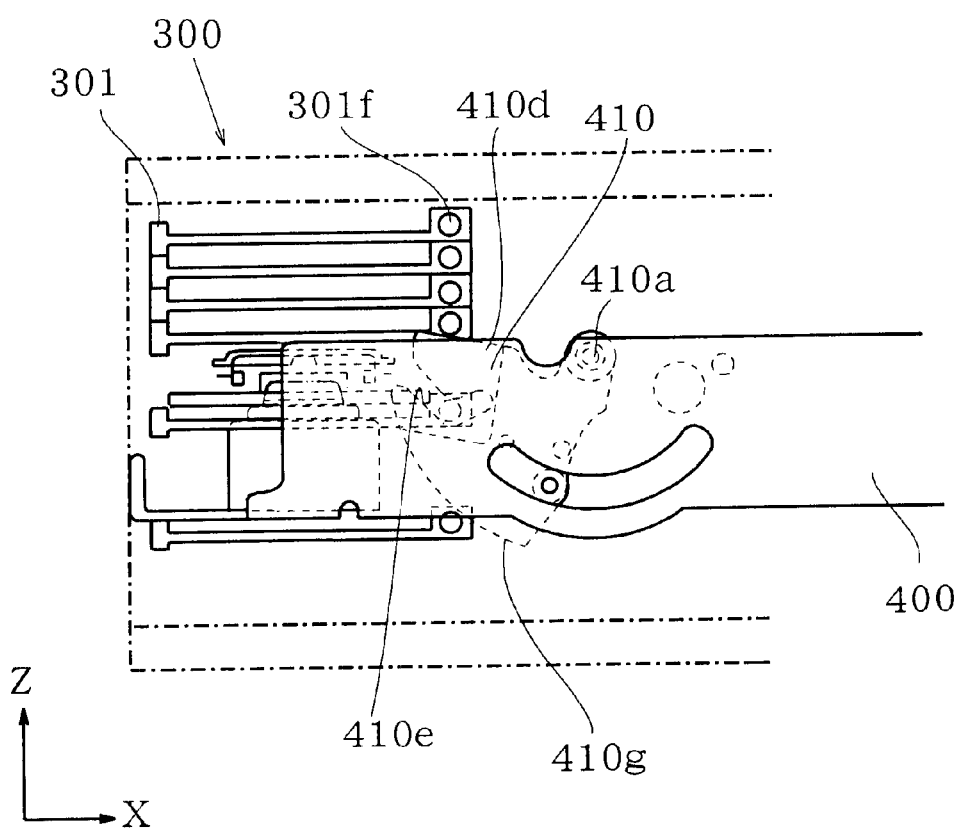
FIG. 23 is an explanatory view indicating an operation of the disc reproducing apparatus of the present invention.

Then, as shown in FIG. 22, the reproducing section driving mechanism is driven, so that the disc reproducing section 200 is moved from its non-reproducing position (FIG. 14) to its reproducing position (FIG. 16).

Meanwhile, the clamper 202 is lowered so as to press the disc in a predetermined manner. At this moment, the wedge members 410 are slightly rotated in the counter clockwise direction so as to slightly lower down the second tray 301 (counting from below). In this way, the disc mounted on the second tray 301 is moved on to the turntable 201, thus separating the disc from the tray 301, thereby making it possible to reproduce the disc under a condition shown in FIG. 23.

By virtue of the above counter clockwise rotation of the wedge members 410, the third to sixth trays 301 (counting from below) are allowed to move down from a Position shown in FIG. 22. Therefore, a space occupied by the third to sixth trays in the direction Z is allowed to be smaller than a space shown in FIG. 22.

As may be understood from the above description, with the use of the improved pickup position detecting means, it is possible to detect the position of a disc transported by the disc transporting means, making it easy to detect whether or not the disc has been received into a desired position within the reproducing apparatus, thus improving the operational reliability of the apparatus.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A disc reproducing apparatus, comprising:
   a disc holder for receiving a plurality of discs;
   a disc reproducing section including a turntable for mounting a disc, an optical pickup for reproducing information recorded on a disc, a pickup moving mechanism for moving the optical pickup in the radial direction of the disc;
   a reproducing section pivoting means for pivoting the reproducing section between a reproducing position and a non-reproducing position; and
   a disc transporting means for transporting a disc inserted from the outside to the disc holder,
      wherein the disc reproducing section includes a position detecting means for detecting a position of the optical pickup and a disc in the reproducing apparatus;
      wherein the position detecting means is adapted to detect the optical pickup being moved into a reproducing position; and
      wherein when the disc reproducing section is in its non-reproducing position, the position detecting means is adapted to detect the position of a disc which has been transported from the outside into the apparatus.

2. A disc reproducing apparatus according to claim 1, wherein the position detecting means includes a pivotable arm pivotable between a detecting position and a non-detecting position, a switch can be made ON or OFF by virtue of the pivotable arm, said pivotable arm having a first portion which can be pressed by the pickup and a second portion which can be pressed by a disc.

3. A disc reproducing apparatus according to claim 2, wherein the switch is adapted to control a driving action of the reproducing section pivoting means and also to control a transporting action of the disc transporting means.

4. A disc reproducing apparatus according to claim 1, wherein the position detecting means is adapted to detect whether the optical pickup is in an innermost circumferential position of a disc.

5. A disc reproducing apparatus according to claim 1, wherein the position detecting means is adapted to detect whether a disc inserted from the outside has been transported to a desired tray of the disc holder.

6. A disc reproducing apparatus according to claim 1, wherein when the disc reproducing section is in its non-reproducing position, the optical Pickup is in a position not detectable by the position detecting means.

7. A disc reproducing apparatus according to claim 1, wherein the disc reproducing section is movable in a disc arranging direction along which the plurality of discs are arranged one above another in the disc holder.

8. A disc reproducing apparatus according to claim 1 or 7, wherein the disc holder includes a plurality of trays each capable of mounting one disc and movable in the disc arranging direction.

9. A disc reproducing apparatus according to claim 1 or 7, wherein when a disc is transported by the disc transporting means, the disc reproducing section is kept at the same height as that of a tray which will receive and hold the disc.

* * * * *